United States Patent
Hasegawa

(10) Patent No.: US 7,406,005 B2
(45) Date of Patent: Jul. 29, 2008

(54) OPTICAL RECORDING MEDIUM, MEMORY APPARATUS, AND RECORDING/REPRODUCTION METHOD

(75) Inventor: Shinya Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 934 days.

(21) Appl. No.: 10/915,091

(22) Filed: Aug. 10, 2004

(65) Prior Publication Data

US 2005/0007894 A1  Jan. 13, 2005

Related U.S. Application Data

(63) Continuation of application No. PCT/JP02/01807, filed on Feb. 27, 2002.

(51) Int. Cl.
G11B 11/00 (2006.01)
G11B 7/24 (2006.01)

(52) U.S. Cl. .................. 369/13.33; 369/275.5

(58) Field of Classification Search ... 369/275.1–275.5, 369/53.11, 53.2, 277, 278, 279, 44.26, 13.33, 369/13.01, 13.56, 13.55, 13.08, 13.47, 13.07; 428/64.4

See application file for complete search history.

(56) References Cited

U.S. PATENT DOCUMENTS

| | | | |
|---|---|---|---|
| 5,696,372 A | 12/1997 | Grober et al. | |
| 5,910,940 A | 6/1999 | Guerra | |
| 6,454,915 B1* | 9/2002 | Shiratori et al. | 204/192.2 |
| 6,665,260 B2* | 12/2003 | Kato et al. | 369/275.4 |
| 6,747,942 B1* | 6/2004 | Tanoue et al. | 369/275.3 |

FOREIGN PATENT DOCUMENTS

| | | |
|---|---|---|
| EP | 1 107 238 | 6/2001 |
| JP | 6-137847 | 5/1994 |
| JP | 6-223401 | 8/1994 |
| JP | 7-006379 | 1/1995 |
| JP | 10-340430 | 12/1998 |
| JP | 11-101809 | 4/1999 |
| JP | 11-250460 | 9/1999 |
| JP | 11-265520 | 9/1999 |
| JP | 2000-090483 | 3/2000 |
| JP | 2000-229479 | 8/2000 |
| JP | 2000-293888 | 10/2000 |
| JP | 2000-322772 | 11/2000 |
| JP | 2000-348348 | 12/2000 |

(Continued)

OTHER PUBLICATIONS

J. Guerra; et al.; Embedded Nano-Optic Media for Near-Field High Density Optical Data Storage: Modeling, Fabrication and Performance; Optical Data Storage Topical Meeting 2001, Santa Fe, NM; pp. 277-279; Apr. 2001.

(Continued)

*Primary Examiner*—Ali Neyzari
(74) *Attorney, Agent, or Firm*—Greer, Burns & Crain, Ltd.

(57) ABSTRACT

An optical recording medium having at least a recording film and a protection film disposed on a substrate is disclosed. The optical recording medium includes a plurality of recording tracks being disposed, along a predetermined direction, on a signal recording surface to which a laser beam is incident, the recording tracks having tapered protruding portions, wherein the protruding portions are formed of an optical near field generation film.

28 Claims, 22 Drawing Sheets

FOREIGN PATENT DOCUMENTS

| | | |
|---|---|---|
| JP | 2001-143295 | 5/2001 |
| JP | 2001-229515 | 8/2001 |
| JP | 2001-344799 | 12/2001 |
| JP | 2002-25138 | 1/2002 |
| JP | 2002-074744 | 3/2002 |
| KR | 1998-072197 | 10/1998 |
| KR | 2002-064065 | 8/2002 |
| WO | WO 99/26240 | 5/1999 |

OTHER PUBLICATIONS

R. Grober et al.; Optical antenna: Towards a unity efficiency near-field optical probe; Applied Physics Letters vol. 70, No. 11; pp. 1354-1356; Mar. 17, 1997.

Applied Physics vol. 68, No. 12, pp. 1380-1383; 1999 (described in specification).

M. Fee et al; Scanning electromagnetic transmission line microscope with sub-wavelength resolution; Optics Communications; vol. 69; No. 3, 4; pp. 219-224; Jan. 1, 1989.

T. Saiki et al.; Tailoring a high-transmission fiber probe for photon scanning tunneling microscope; Applied Physics Letters vol. 68, No. 19; pp. 2612-2614; May 6, 1996.

T. Yatsui et al.; Increasing throughput of a near-field optical fiber probe over 1000 times by the use of a triple-tapered structure; Applied Physics Letters vol. 73, No. 15; pp. 2090-2092; Oct. 12, 1998.

J. Koglin et al.; Material contrast in scanning near-field optical microscopy at 1-10 nm resolution; Physical Review Vo. 55, No. 12; pp. 7977-7984; Mar. 15, 1997.

M. Ohtsu et al.; Near Field Optics and Its Application to Optical Memory; Electronics and Communications in Japan, Part 2, vol. 81, No. 8; pp. 41-48; 1998.

* cited by examiner

FIG.16
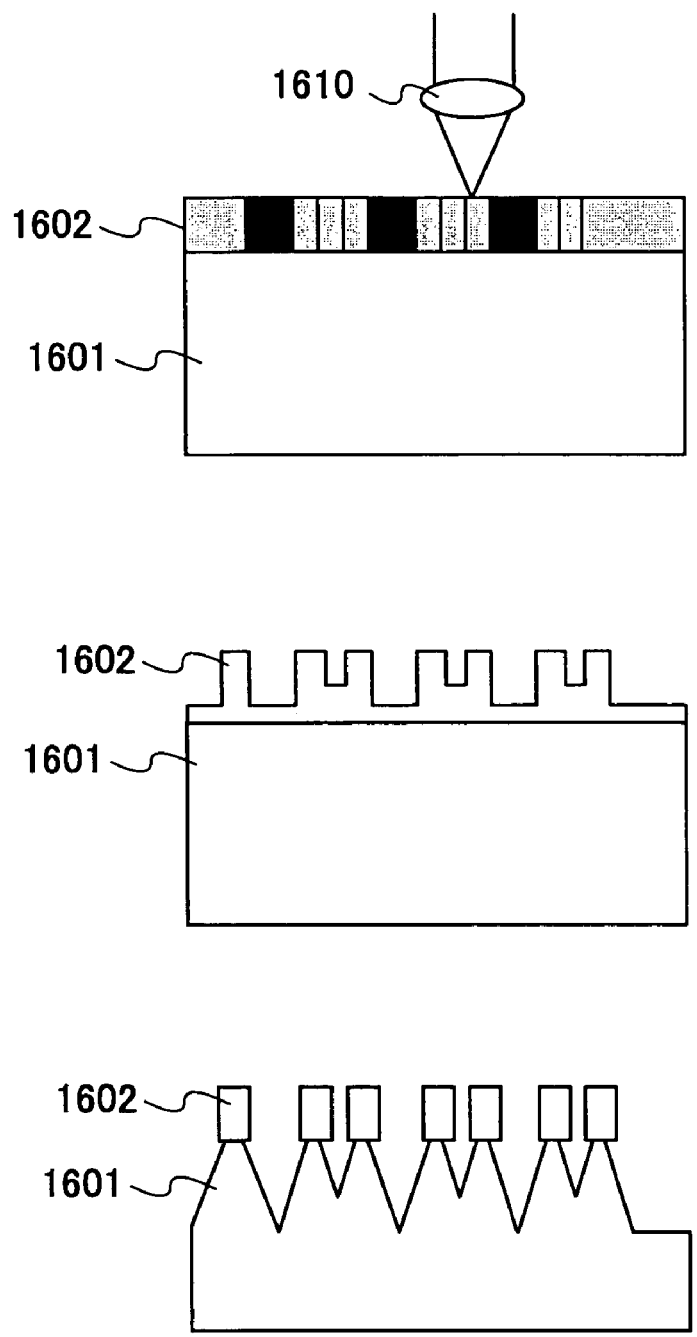
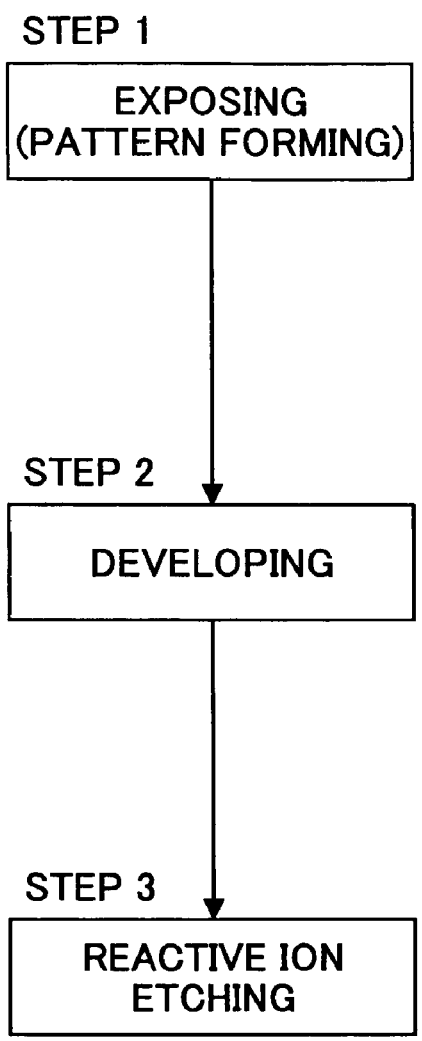

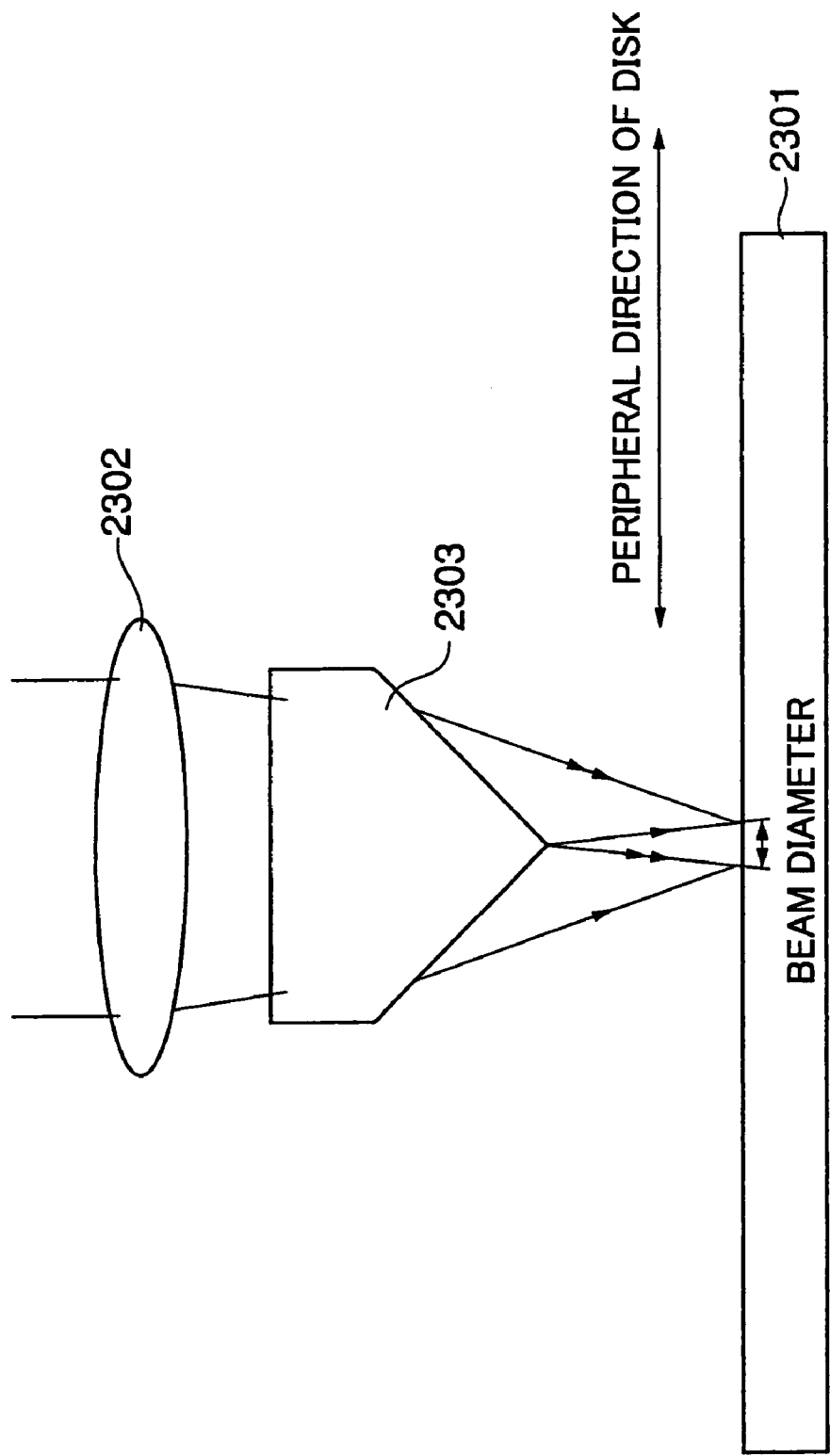

OPTICAL RECORDING MEDIUM, MEMORY APPARATUS, AND RECORDING/REPRODUCTION METHOD

CROSS-REFERENCE TO RELATED APPLICATIONS

This application is a U.S. continuation application filed under 35 USC 111 (a) claiming benefit under 35 USC 120 and 365 (c) of PCT application JP02/01807, filed on Feb. 27, 2002.

BACKGROUND OF THE INVENTION

1. Field of the Invention

The present invention generally relates to an optical recording medium, a memory apparatus, and a recording/reproduction method, more particularly, a high density optical recording medium, a memory apparatus, and a recording/reproduction method that use optical near field.

2. Description of the Related Art

In a conventional optical head for an optical disk, light is condensed by using a lens. In this case, the amount of information that can be recorded onto the optical disk depends on the diameter of the condensed beam. The diameter of such condensed beam is confined to the wavelength of the laser beam for recording and/or reproducing information to/from the optical disk, and by the numerical aperture (NA) of the optical lens system. In order to obtain a high density optical disk, it is required to shorten the wavelength of the laser beam and to increase the numerical aperture of the optical lens. Nevertheless, due to limits in diffraction, there are limits in obtaining such high density optical disks with such methods.

In order to increase the numerical aperture of the optical lens system, a method for recording information onto an optical disk medium is proposed, in which a numerical aperture (NA) of 1 or more is obtained by employing a SIL (Solid Immersion Lens) and utilizing the evanescent light leaking from the bottom of the SIL. Nevertheless, recording information onto the optical disk medium by utilizing the evanescent light requires the distance between the SIL and the recording surface of the optical disk to be maintained at no more than 1/10 of the wavelength. Therefore, precise control is required for maintaining a constant distance between the optical disk and the SIL. There is also a problem where dust may adhere to the optical disk to cause contact with the SIL. The problem of dust causes difficulty in attaining removability, which is one of the benefits of the optical disk. Furthermore, there are limits in obtaining a high density optical disk by employing the SIL since the numerical aperture (NA) is increased based on the refractive index of the SIL.

Meanwhile, a method for recording and/or reproducing information to/from an optical disk is proposed, in which an optical near field is used for increasing capacity of an optical disk by intensifying the density of the optical disk.

As for a widely used optical near field probe serving to generate the optical near field, there is an optical fiber (optical fiber probe) having a sharpened tip with a fine opening of a size no more than the wavelength of the laser beam used for recording and/or recording. The optical fiber probe is manufactured by applying metal coating to portions other than its tip portion after heating and stretching an end of an optical fiber or after tapering an optical fiber with a chemical etching method. Accordingly, by directing an incident laser beam on the optical fiber probe, an optical near field can be generated at the proximity of the fine opening formed at the tip portion.

Nevertheless, the optical fiber probe has a drawback of inefficient utilization of light. For example, in a case where the aperture diameter is 100 nm, the ratio of the optical strength of the incident laser beam on the optical fiber probe to the laser beam emitted from the tip portion of the optical fiber probe becomes 0.001% or less, thereby resulting to an emitted laser beam with considerably low optical strength. In order to solve this problem, the below-given optical near field probes are proposed.

The first probe is a multi-level taper optical fiber probe. This optical fiber probe is described in "Applied Physics Letters" (Vol.68, No. 19, p. 2612-2614) issued in 1996, and "Applied Physics Letters" (Vol. 73, No. 15, p. 2090-2092) issued in 1998. This optical fiber probe has its pointed tip formed in two or three varying levels from its root portion to its tip portion.

The next probe is a metal needle probe. This probe is described in Japanese Laid-Open Patent Application No. 6-137847, in which light is irradiated to a tip of a needle for generating an optical near field in proximity to the tip portion.

The next probe is a fine aperture fiber probe with a fine metal sphere. This fiber probe is described in Japanese Laid-Open Patent Application No. 11-101809, in which a fine metal sphere is formed at a center of a fine aperture of a tip portion of the fiber probe. In this fiber probe, an optical near field is generated by irradiating light from the fine aperture and thereby exciting plasmon in the fine metal sphere.

The next probe is a probe with a metal coated glass segment. This probe is described in "Physical Review B" (Vol. 55, No. 12, p. 7977-7984) issued in 1997. This probe has a metal film with a thickness of approximately 50 nm formed on a triangularly cut-out glass segment, in which surface plasmon is excited on the metal film. Accordingly, since the excited surface plasmon is propagated toward the tip of the probe, a strong optical near field is generated in proximity to the tip.

The next probe is a glass substrate probe with a metal scatterer. This probe is described in Japanese Laid-Open Patent Application No. 11-250460. This is a probe having a metal scatterer attached to a bottom portion of a glass substrate. By attaching the metal scatterer, a strong optical near field is generated in proximity to the metal scatterer.

In near field optics, it is necessary to maintain a space of approximately a few nanometers (nm) to several tens of nanometers between an optical near field generating member and the recording surface. Accordingly, in the above-described probes formed with the optical fiber or the glass segment, a particular control system is necessary for precisely controlling the space between the tip portion of the probe and the recording surface. This control system, in general, measures the space between the tip portion of the probe and the recording surface by measuring the atomic force between the tip portion of the probe and the recording surface, and servo controls the position of the probe so that the measured value is constant. Nevertheless, since there is a certain limit to the servo control area, the relative scanning speed of the probe with respect to a recording medium is to be no more than a prescribed speed with an error no more than a prescribed value. Particularly, in an optical disk memory device required to provide high speed data transfer, it is necessary to increase the speed at which the probe can scan the optical disk. Nevertheless, in a case where a disk having tilt or skew is rotated at high speed, the servo control system may be unable to provide sufficient control since the probe is required to trace large disturbances with high frequency amplitude. In order to solve the problem, the below described probe is proposed.

The first probe is a flat aperture optic fiber probe. This optical fiber probe is described in "Electronics and Communications in Japan" (Part 2, Vol. 81, No. 8, p. 41-48) issued in 1998 (translated from "Journal of The Institute of Electronics, Information, and Communication Engineers Vol. J81-C-I, No. 3, p. 119-126). This probe has an aperture formed by applying an anisotropic etching technique to a silicon substrate. Since the portion surrounding the aperture is flat, the distance between the tip portion of the probe and the recording surface can be maintained constant when the probe approaches the recording medium.

The next probe is a pad aperture probe. This probe is described in Japanese Laid-Open Patent Application No. 11-265520. This probe has a quadrangular pyramid-shaped protrusion with a fine aperture formed at a tip portion thereof, and also has a pad formed at a surrounding portion of the protrusion. The pad serves to maintain the distance between the tip portion of the probe and the recording surface constant.

The next probe is a plane illumination laser probe with a fine metal chip. This probe is described in "Applied Physics" (Vol. 68, No. 12, p. 1380-1383) issued in 1999. This probe has a fine metal protrusion with a fine aperture formed at an end face of the plane illumination laser port. Since the probe has a flat structure, the distance between the tip portion of the probe and the recording surface can be maintained constant when the probe approaches the recording medium.

The next probe is described in "Optics Communications" (Vol. 69, Nos. 3 and 4, p. 219-224) issued in 1989. This probe is designed to efficiently generate a slight optical near field. This probe efficiently generates the optical near field by applying light to a patch antenna and a coaxial cable.

Another probe is described in U.S. Pat. No. 5,696,372 issued on Dec. 9, 1997 (Grober et al.). This probe is also aimed at efficiently generating a slight optical near field. This probe employs a fine dipole antenna formed with a bow-tie shaped metal segment for generating a slight optical near field.

With a system for recording and/or reproducing information by using an optical near field, the three below given factors are required to be satisfied. First, it is required to precisely control the distance between the optical near field probe or the like serving to generate the optical near field and the recording medium to be a constant distance shorter than the wavelength of the laser beam used for recording/reproducing information. Second, the beam spot of the generated optical near field is required to be of a fine size. Third, the generated optical near field is required to be of high light use efficiency.

The above-described multi-stage pointed optical fiber probe has a light use efficiency which is approximately 10 to 100 times higher than that of a typically used fiber probe, but is still insufficient to be applied for optical recording/reproduction, which requires a high light use efficiency of 10% or more. In addition, it is mechanically fragile, and is especially vulnerable in high speed scanning since optical fiber is used.

All of the metal needle probe, the fine aperture fiber probe with a fine metal sphere, the probe with a metal coated glass segment, and the glass substrate probe with a metal scatterer are able to attain high light use efficiency by utilizing their metal property. All of them, however, are formed with a mechanically fragile tip, and are, therefore, particularly vulnerable in high speed scanning. Particularly, the metal pin probe and the glass substrate probe with a metal scatterer have a problem in that a large amount of background light is detected therefrom since the light that is irradiated neither to the tip of the needle nor the scatterer becomes incident on the recording medium.

Furthermore, as described above, some other probes capable of providing high speed scanning are also proposed. Although the flat aperture probe and the pad aperture probe can be used in high speed scanning, their light use efficiency is low.

The plane illumination laser probe with a fine metal chip is expected to provide high speed scanning performance, high light use efficiency, and little background light. In generating a strong optical near field by using the metal fine protrusion of the probe, the form of the metal is to be optimized. Nevertheless, neither the form nor the method of manufacture is disclosed.

With the probe for efficiently generating an optical near field by applying light to a patch antenna and a coaxial cable, or with the probe employing a fine dipole antenna formed with a bow-tie shaped metal segment for generating a slight optical near field, there still is a problem with dust on the recording medium, and a problem in precisely controlling the distance between the optical near field generating member and the recording medium to a constant minute distance that is shorter than the wavelength of the laser beam used for recording/reproduction (head/disk interface problem). It is, therefore, difficult to attain removability, which is one of the advantages of an optical disk.

Meanwhile, a method where a lens-like substrate is disposed in an optical disk medium for improving recording density is disclosed in "Optical Data Storage 2001 Technical Digest of 2001, April 22-25, (p. 277-279, Guerra et al.). This method is aimed at solving the dust problem and the head/disk interface problem. However, this method does not use an optical near field, but uses light condensed by a micro-lens installed in a recording medium for recording/reproducing with the recording medium. This enables recording density to be increased by increasing the refractive index of the material of the lens. Nevertheless, as described in the document, the track pitch can merely be reduced to approximately one half when using a typical optical system since there are limits to the refractive index. As a result, its recording density can only be enhanced to approximately two times. Furthermore, manufacture of the recording medium is difficult since the recording medium requires a spherical lens-shaped substrate to be uniform at its periphery. Furthermore, the track pitch can only be narrowed to a small degree, and recording density cannot be largely increased since it is possible that the beam may diffuse to an adjacent track and cause problems such as cross-talk, cross-erase, and cross-write. In addition, the lens uses, for example, $TiO_2$ as its material since a refractive index of 2.7 is required. With such material, however, light cannot pass through in a case of employing a blue-violet laser diode (LD) with a wavelength of 410 nm. Accordingly, the method cannot be applied to a short wavelength laser diode, and cannot attain high recording density.

SUMMARY OF THE INVENTION

It is a general object of the present invention to provide an optical recording medium, a memory apparatus, and a recording/reproduction method, that substantially obviate one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by an optical recording medium, a memory apparatus, and a recording/reproduction method particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides an optical recording medium having at least a recording film and a protection film disposed on a substrate, the optical recording medium including: a plurality of recording tracks being disposed, along a predetermined direction, on a signal recording surface to which a laser beam is incident, the recording tracks having tapered protruding portions; wherein the protruding portions are formed of an optical near field generation film.

According to an embodiment of the present invention, the optical near field generation film may be a metal film.

According to an embodiment of the present invention, the optical near field generation film may have a complex permittivity for which at least one of a real part and an imaginary part is a negative value for laser wavelength.

According to an embodiment of the present invention, the optical near field generation film may have a complex permittivity for which a real part is a negative value and an absolute value of an imaginary part is smaller than that of the real part for laser wavelength.

According to an embodiment of the present invention, the optical near field generation film may have an absolute value of a complex refractive index for which an imaginary part is larger than that of a real part for laser wavelength.

According to an embodiment of the present invention, a distance between the optical near field generation film and the recording film may be no more than 1/10 of the wavelength λ of the laser beam incident on the signal recording surface.

According to an embodiment of the present invention, one of the tapered protruding portions may have a height that is different from that of another one of the tapered protruding portions.

According to an embodiment of the present invention, one of the tapered protruding portions may have an apex angle that is different from that of another one of the tapered protruding portions.

According to an embodiment of the present invention, the tapered protruding portions may have an apex angle of 90 degrees or less.

According to an embodiment of the present invention, a flat portion may be disposed between two adjacent of the tapered protruding portions.

According to an embodiment of the present invention, a tip portion of one of the tapered protruding portions may have a flat part.

According to an embodiment of the present invention, the flat part may satisfy a relation of $$d \leq \lambda/(2n),$$

wherein d represents the length of the flat part, n represents the refractive index of the substrate, and λ represents the wavelength of the incident laser beam, wherein d does not include 0.

According to an embodiment of the present invention, a tip portion of the tapered protruding portions may have an inflection point.

According to an embodiment of the present invention, a tip portion of the tapered protruding portions may have a curved shape.

According to an embodiment of the present invention, both corners of a tip portion of the tapered protruding portions may be curved.

According to an embodiment of the present invention, the height of the tapered protruding portions may be changed every cycle, wherein one cycle has N tracks, wherein the tracks are disposed to satisfy a relation of λ/d<1, where λ represents the wavelength of the incident laser beam, and d represents a length of one cycle.

According to an embodiment of the present invention, the optical recording medium may further include a plurality of signal recording layers disposed in a thickness direction of the optical recording medium.

According to an embodiment of the present invention, the tapered protruding portions may include the optical near field generation film, the protection film, and the recording film that are stacked on the substrate in an order of the optical near field generation film, the protection film, and the recording film.

According to an embodiment of the present invention, the tapered protruding portions may include the optical near field generation film, the protection film, and the recording film that are stacked on the substrate in an order of the recording film, the protection film, and the optical near field generation film.

Furthermore, the present invention provides an apparatus for recording or reproducing signals, the apparatus including: an optical source for irradiating a light beam; an optical head for condensing the light beam onto an optical recording medium including a plurality of recording tracks being disposed, along a predetermined direction, on a signal recording surface to which the light beam is incident, the recording tracks having tapered protruding portions; and a moving part for moving the optical head; wherein the signals are recorded on the optical recording medium or reproduced from the optical recording medium by an optical near field generated from the light beam condensed to a tip portion of the tapered protruding portions.

Furthermore, the present invention provides an apparatus for recording or reproducing signals, the apparatus including: an optical source for irradiating a light beam; an optical head for condensing the light beam onto an optical recording medium including a plurality of recording tracks being disposed, along a predetermined direction, on a signal recording surface to which the light beam is incident, the recording tracks having tapered protruding portions; a moving part for moving the optical head; and a magnetic head for functioning as a magnetic field modulating magnetic recording head and a magnetic reproduction head; wherein the signals are recorded on the optical recording medium or reproduced from the optical recording medium by an optical near field generated from the light beam condensed to a tip portion of the tapered protruding portions.

According to an embodiment of the present invention, the magnetic head may be a giant magnetic resistance head or a tunnel magnetic resistance head.

According to an embodiment of the present invention, the apparatus may further include an optical super resolution part for reducing the optical strength of a portion of the optical recording medium surrounding a beam spot of the light beam.

According to an embodiment of the present invention, after the optical recording medium is mounted to the apparatus, the optical recording medium may be recorded with address information for indicating locations inside the optical recording medium.

According to an embodiment of the present invention, a linearly polarized light of the incident light beam irradiated from the optical source may be a p-polarized light that perpendicularly intersects a scanning direction of the optical recording medium.

Furthermore, the present invention provides a memory apparatus including: an optical source for irradiating a light beam; an optical head for condensing the light beam onto an optical recording medium including a plurality of recording tracks being disposed, along a predetermined direction, on a signal recording surface to which the light beam is incident, the recording tracks having tapered protruding portions; a moving part for moving the optical head in a direction along the recording tracks; a detecting part for detecting reflected light from the optical recording medium; and a tracking control part for executing tracking control with the moving part according to push-pull signals obtained from the detecting part.

Furthermore, the present invention provides an apparatus for recording or reproducing signals, the apparatus including: an optical source for irradiating a light beam; an optical head for condensing the light beam onto an optical recording medium including a plurality of recording tracks being disposed, along a predetermined direction, on a signal recording surface to which the light beam is incident, the recording tracks having tapered protruding portions; and a moving part for moving the optical head; wherein the signals are recorded on the optical recording medium or reproduced from the optical recording medium by an optical near field generated from the light beam condensed to a tip portion of the tapered protruding portions; and wherein the optical head includes apertures, having no more than half the size of the wavelength λ of the light beam, disposed along a predetermined direction.

Furthermore, the present invention provides a method of recording or reproducing signals including the steps of: irradiating a light beam from an optical source; condensing the light beam onto an optical recording medium including a plurality of recording tracks being disposed, along a predetermined direction, on a signal recording surface to which the light beam is incident, the recording tracks having tapered protruding portions; and recording or reproducing signals with an optical near field generated from the tapered protruding portions of the optical recording medium.

BRIEF DESCRIPTION OF THE DRAWINGS

FIG. 16 is a schematic diagram showing a method of manufacturing a high density optical recording medium according to another embodiment of the present invention;

FIG. 23 is a schematic diagram for explaining attainment of high density in a scanning direction of a beam spot according to another embodiment of the present invention.

DESCRIPTION OF THE PREFERRED EMBODIMENTS

In the following, embodiments of the present invention are described with reference to the accompanying drawings.

Figure 1:
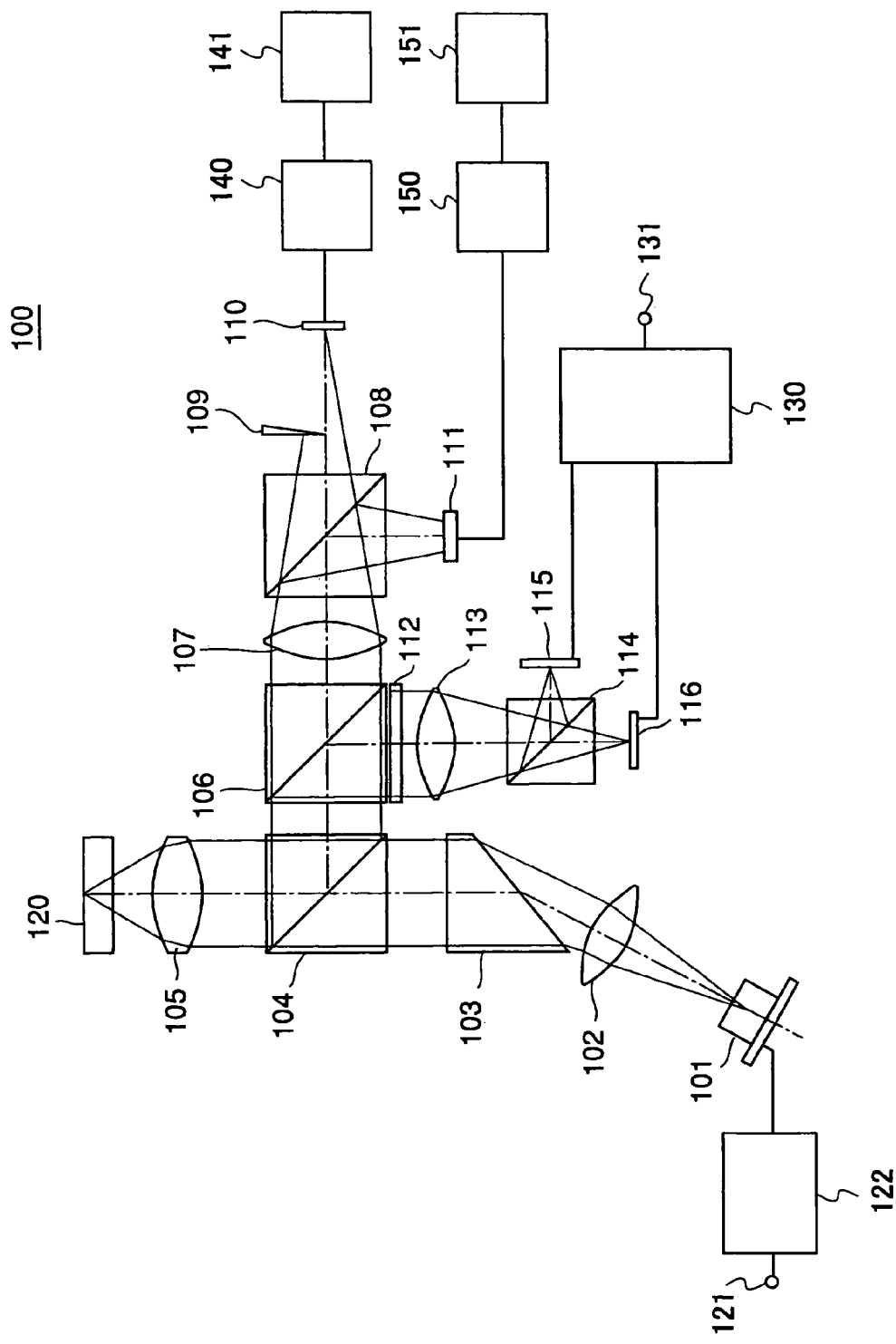
FIG. 1 is schematic diagram showing an exemplary optical recording/reproduction system for recording and/or reproducing signals to or from an optical disk.

FIG. 1 is a schematic view showing an apparatus 100 for recording signals to an optical disk and/or reproducing signals recorded to an optical disk according to an embodiment of the present invention. Although a magnetic optical recording technique is applied in this embodiment, other techniques, such as, a phase change technique, may alternatively be applied to the present invention.

In FIG. 1, an optical system of a head for a magnetic optical disk is shown, in which a recording/reproduction apparatus 100 mainly includes, for example, a recording/reproduction optical system including a semiconductor laser 101 (laser diode), a collimator lens 102, a beam shaping prism 103, a first polarization beam splitter 104, an objective lens 105, a second polarization beam splitter 106, a condensing lens 107, a half-prism 108, a knife-edge 109, a first photo detector 110, a second photo detector 111, a λ/2 plate 112, a condensing lens 113, a third polarization beam splitter 114, a third photo detector 115, and a fourth photo detector 116; a recording system 122 for driving the semiconductor laser 101 from an input of data 121; a reproduction system 130 for reproducing a reproduction signal 131 from the outputs of the third photo detector 115 and the fourth photo detector 116; a focus control system 140 for performing focus control based on output of the first photo detector 110; a focus actuator 141 driven by the focus control system 140; a tracking control system 150 for performing tracking control based on output of the second photo detector 111; and a track actuator 151 driven by the tracking control system 150.

In recording the data 121 onto an optical disk 120, the data 121 is input to the recording system 122, and the recording system 122 drives the laser diode 101 according to the input data 121. In reading out data recorded to the optical disk 121, the laser diode 101 outputs light having an optical strength for reproduction.

The laser light beam emitted from the semiconductor laser 101 is converted to a parallel beam by the collimator lens 102. After passing the beam shaping prism 103, the beam is converted to a linear polarized light in a direction perpendicular to the scanning direction of the optical disk 120 (P-polarized light) by the first polarization beam splitter 104 for obtaining satisfactory recording/reproduction performance with the magnetic optical technique, and is directed to the objective lens 105, thereby being condensed onto the optical disk 120 by the objective lens 105. Here, in a case where signals are recorded on the optical disk 120, the polarization angle of reflected light rotates owing to the Kerr effect. That is, in a case where signals are recorded, a P component light for signal detection is rotated for a rotation angle of $\theta_K$ owing to the Kerr effect, to thereby generate an S component light. The reflected light of P and S components passes through the second polarization beam splitter 106, the λ/2 plate 112, the condensing lens 113, and is separated to P component light and S component light by the third polarization beam splitter 114. The separated P component light and the S component light are incident on the third photo detector 115 and the fourth photo detector 116, respectively. The reproduction system 130 calculates the difference of optical strength between the P component light and the S component light according to the difference in the output between the third photo detector 115 and the fourth photo detector 116, to thereby detect the signals recorded on the optical disk 120, and output the signals as reproduction signals 131.

Meanwhile, a part of the light reflected from the optical disk 120 is separated by the second polarization beam splitter 106, and is incident on the knife-edge 109 after passing through the condensing lens 107 and the half-prism 108. The amount of light incident on the first photo detector 110 via the knife-edge 109 changes depending on the amount of deviation of the focal point of the laser beam condensed on the optical disk 120. The focus control system 140 detects focus error signals by detecting the changes in the amount of light incident on the first photo detector 110. Then, in accordance with the focus error signals, the focus control system 140 drives the focus actuator 141, and controls the position of the objective lens 105 for condensing the laser beam on the optical disk 120.

Meanwhile, a part of the light separated by the half-prism 108 is incident on the second photo detector 111 for generating tracking error signals. According to the generated tracking error signals, the tracking control system 150 drives the tracking actuator 151 and moves the objective lens 105 in a radial direction of the optical disk 120 for enabling the laser beam spot to trace the track having signals recorded thereto.

Figure 2:
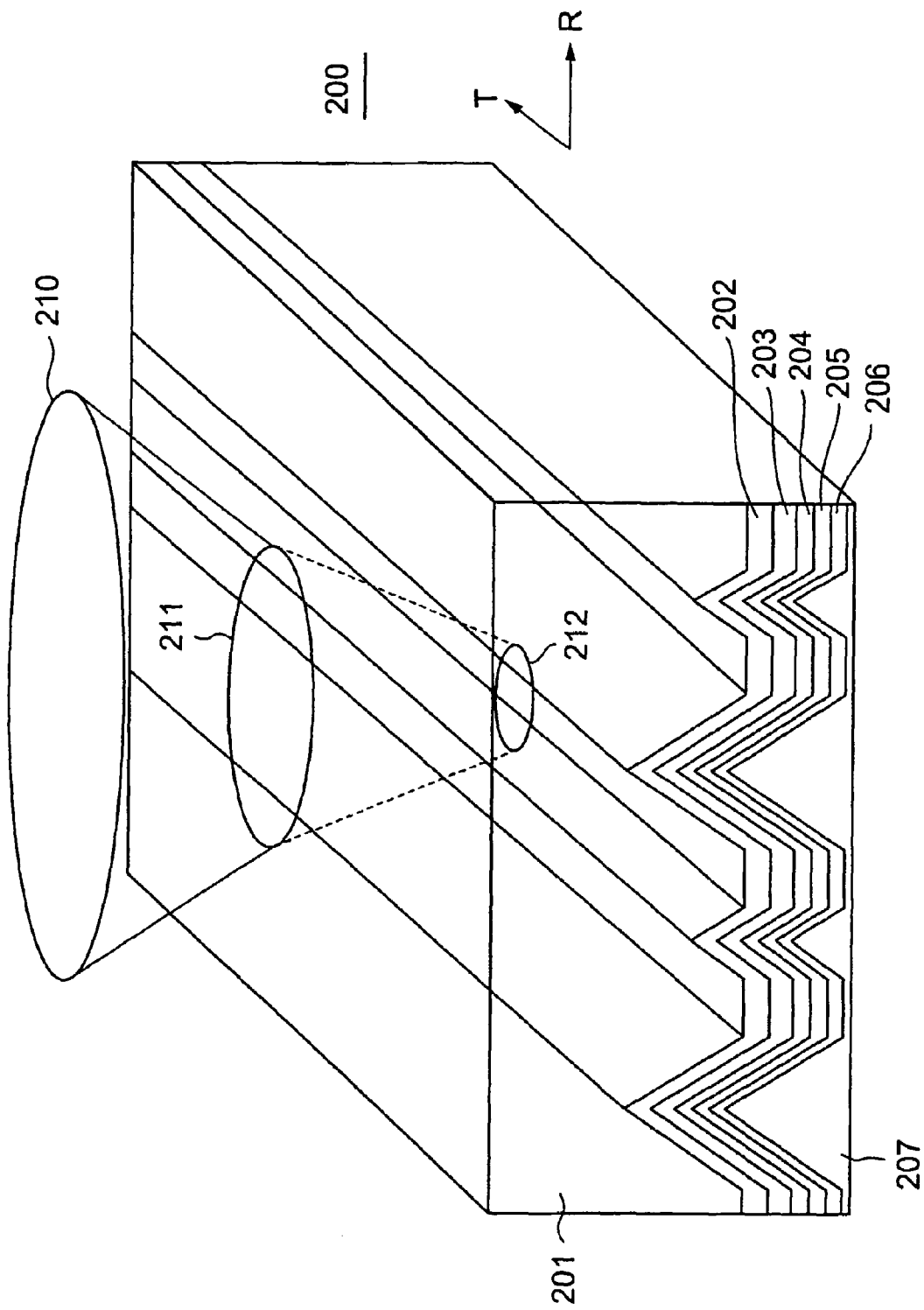
FIG. 2 is a schematic view showing a high density optical disk according to an embodiment of the present invention.

With such an optical disk apparatus, the distance between the optical disk medium and a tip portion of the optical head is on the order of several 100 μm to several mm. By using the advantage of the distance, the optical disk medium may serve as a removable, inexpensive and highly reliable recording medium for wide use. Next, an exemplary high density optical recording medium according to the present invention is described with reference to FIG. 2. FIG. 2 shows a high density optical disk 200 having a substrate 201, an optical near field generation film 202, a protection film 203, a recording film 204, a protection film 205, a reflection film 206, and a protection film 207. In FIG. 2, the arrow R indicates a radial direction of the high density optical disk 200, and the arrow T indicates a tangential line direction in a case where the high density optical disk 200 is rotated. Tracks to which signals are recorded are consecutively formed in the tangential direction on the high density optical disk 200. The tracks form tapered protruding parts along the tangential direction. The protruding parts are shaped with the same linear form along the tangential direction, and are formed with prescribed inclinations in the radial direction, thereby forming a triangular peak at the tip portions. A laser beam 210, being incident on the substrate 201, forms a shape 211 on an incident plane on the substrate 201. Further, the laser beam 210, being refracted at the substrate 201, is condensed on the tip portion of the optical near field film 202, thereby forming a laser spot 212 thereon. The optical near field film 202 may be formed, for example, as a thin film of metal (e.g. gold, silver, titanium, or aluminum), or of plastic or silicon in a case where a high sensitivity recording/reproduction material is used. The metal thin film may employ, for example, a material having the complex permittivity for which at least one of a real part or an imaginary part is a negative value for laser wavelength, a material having the complex permittivity for which a real part is a negative value and thus the absolute value of an imaginary part is smaller than that of the real part, or a material having the absolute value of the imaginary part of the complex refractive index which is larger than that of the real part of the complex refractive index. A conventional probe or the like for generating optical near field requires a hole to be drilled with, for example, an expensive focused ion beam (FIB), so as to form a fine aperture of a size no more than the wavelength of the laser beam for allowing the optical near field to pass therethrough. The present invention, however, requires no such fine aperture, or slit, to thereby achieve manufacture at low cost.

Next, the optical near field generation film 202 formed of thin metal material or the like may have a protection film 203 formed of, for example, silicon nitride (SiN) disposed at the opposite side of its incident surface. Further, the recording film 204 (TbFeCo), the protection film 205, and the reflection film 206 are formed therebelow. For example, a material with a high refractive index (e.g. $ZnS/SiO_2$) of approximately 2 may preferably be used for the optical near field generation film 202 in order to reduce cross-talk between adjacent tracks. Last, the protection film 207 is formed therebelow.

Figure 3:
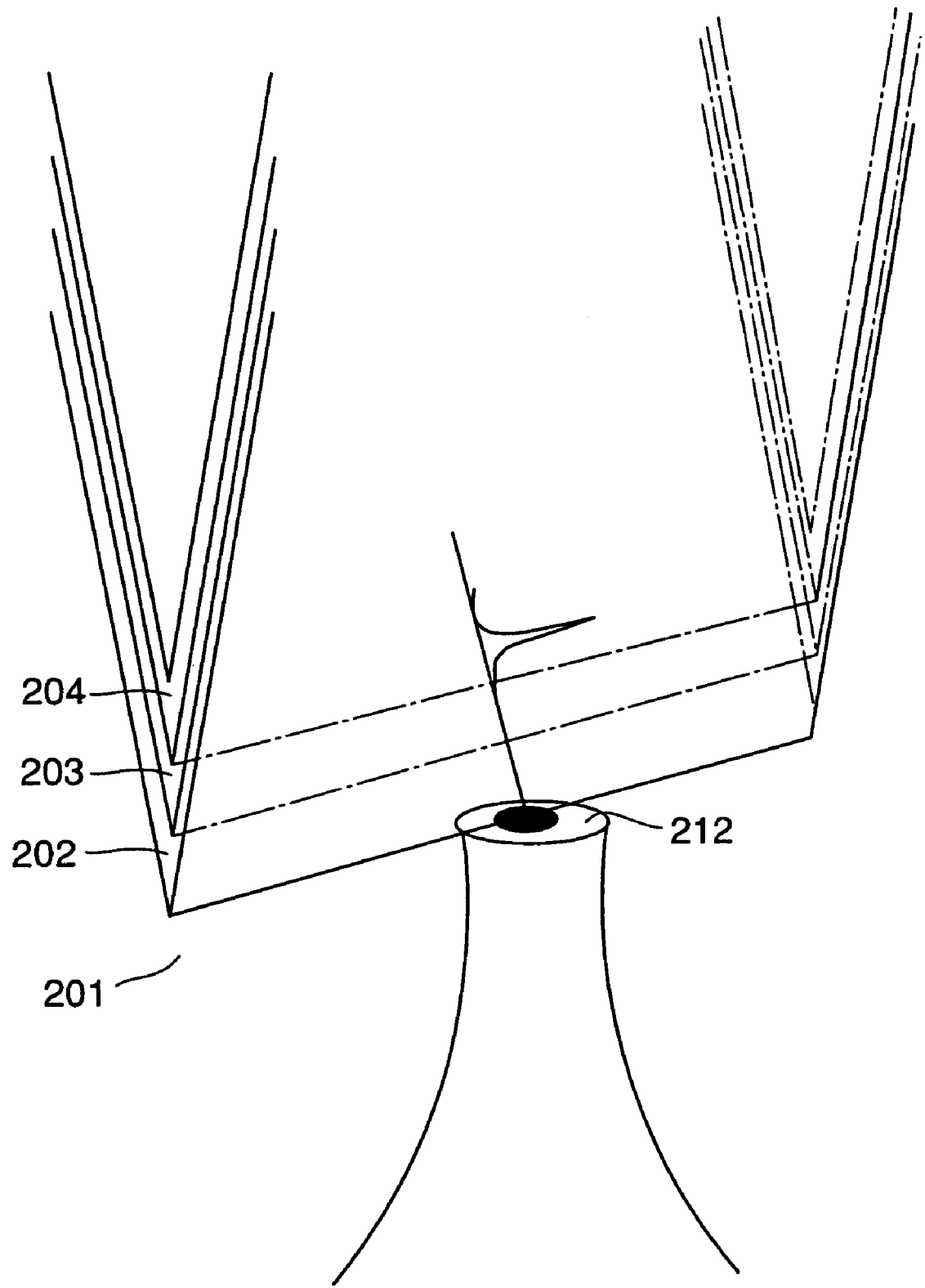
FIG. 3 is a schematic diagram for explaining a principle in using the present invention.

Next, a principle of the present invention is described with reference to FIG. 3. In FIG. 3, like components are denoted by like reference numerals as of FIG. 2.

With an objective lens used for a typical optical disk apparatus as described in FIG. 1, it is found that, according to calculation, when a laser beam is irradiated to the tip portion of the optical near field generation film 202 from the side of the substrate 201 in a condensing manner, the electric field (light) is intensified at a portion beneath the optical near field generation film 202 where the laser beam has transmitted therethrough. Furthermore, it is found that the optical strength of the laser beam is maximum at an area (near field area) located at a predetermined distance from the optical near field generation film 202, and that the optical strength rapidly decreases when further apart from the near field area. This results from the property of the optical near field. In a conventional example of generating an optical near field by using a probe for generating the optical near field, the distance between the optical near field generation probe and a recording medium (optical disk) is required to be controlled so that the optical near field is irradiated to a recording film of the recording medium while the recording medium is rotated. As described above, the conventional example faces the head/disk interface problem. With the present invention, however, since the optical near field generation film 202 for intensifying the electric field is buried in the optical disk medium, the distance between the optical near field generation film 202 and the recording film 204 can be defined when forming the films in a process of optical disk manufacture.

For example, in a case where the wavelength of the laser beam incident on the signal recording surface is indicated as λ, it is preferable that the distance between the optical near field generation film 202 and the recording film 204 be λ/10 or less (however, 0 nm not included) for satisfactorily generating an optical near field. It is to be noted that if the optical near field generation film 202 is too thick, the optical near field cannot be generated since light is unable to be transmitted therethrough. Furthermore, by using a conventional sputtering apparatus or the like, the distance between the films can be precisely controlled in nanometer (nm) sizes. Accordingly, as long as a laser beam is controlled to condense at the tip portion of the optical near field generation film 202 by using an optical system of a typical optical disk apparatus, an optical near field can be generated in an area situated at a predetermined distance apart from the tip portion of the optical near field generation film 202 buried in the optical disk 120, thereby enabling the generated optical near field to be used for recording signals on the recording film 204 of the optical disk 120. Accordingly, the present invention has no difficulty in controlling the distance between the probe and the recording medium for generating the optical near field (head-disk interface problem).

Figure 4:
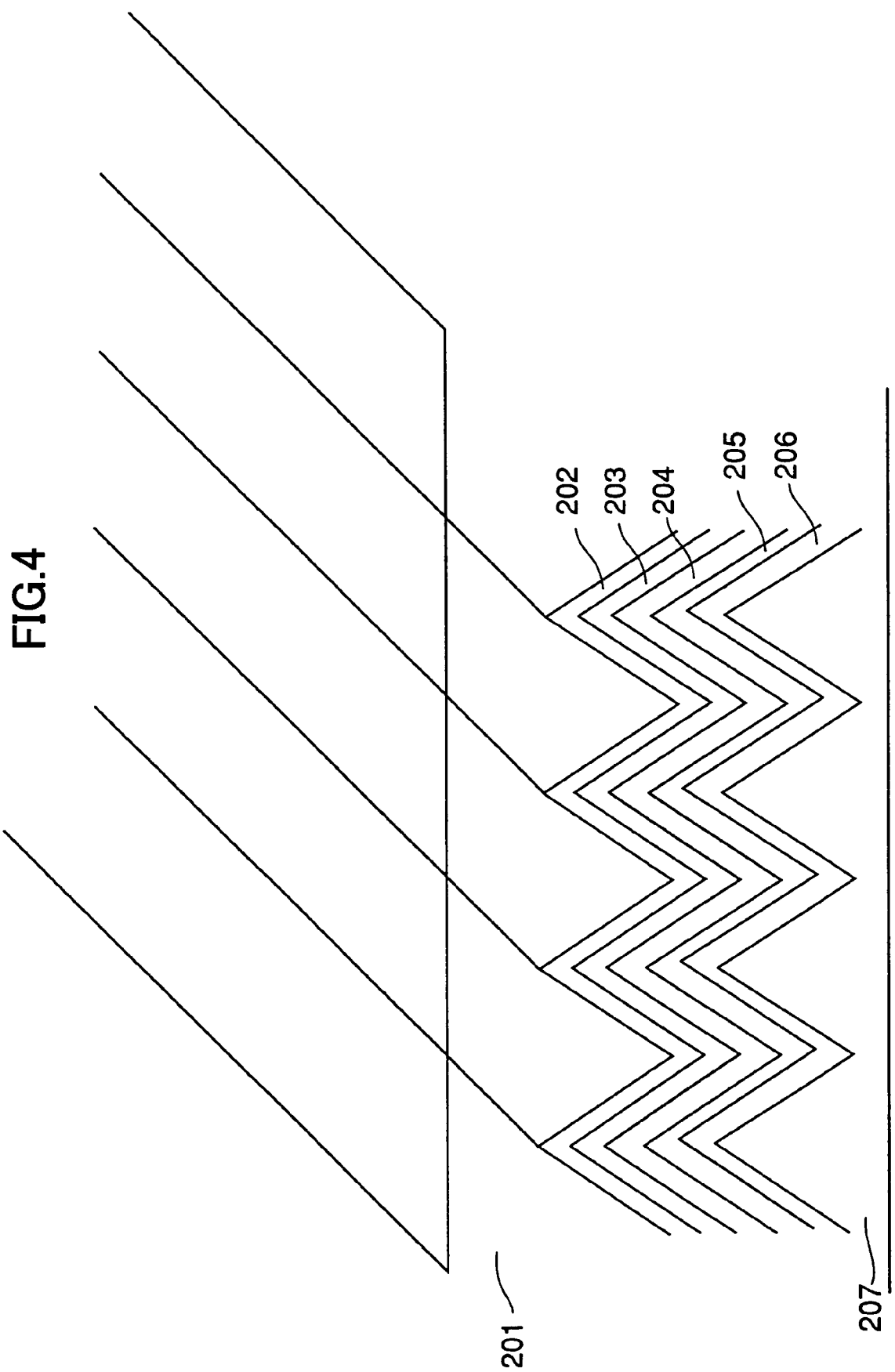
FIG. 4 is a schematic diagram showing a model used in calculating intensification of optic electric field according to an embodiment of the present invention.

Next, a calculation result in intensifying electric field (light) is described. FIG. 4 shows a model used for the calculation. In FIG. 4, like components are denoted by like reference numerals as of FIG. 2. In calculating the intensification of electric field, an FDTD method (Finite Difference Time Domain Method) is applied to the model shown in FIG. 4. Here, the wavelength of the irradiated laser beam is 780 nm, the numerical aperture (NA) of the objective lens is 0.8, and the diameter of the condensed beam is 0.95 μm (1/e2). Further, the polarization of the laser beam is calculated as being TM polarization (P polarization) where the direction of the polarized laser beam is the radial direction of the optical disk. Further, the track pitch is 500 nm. Further, a metal thin film of gold having a thickness of 40 nm is used for the optical near field generation film 202, in which the refractive index is 0.175-i 4.91. Here, the letter i indicates an imaginary part of complex permittivity. Further, the angle of the apex of the triangles is 30 degrees.

Figure 5:
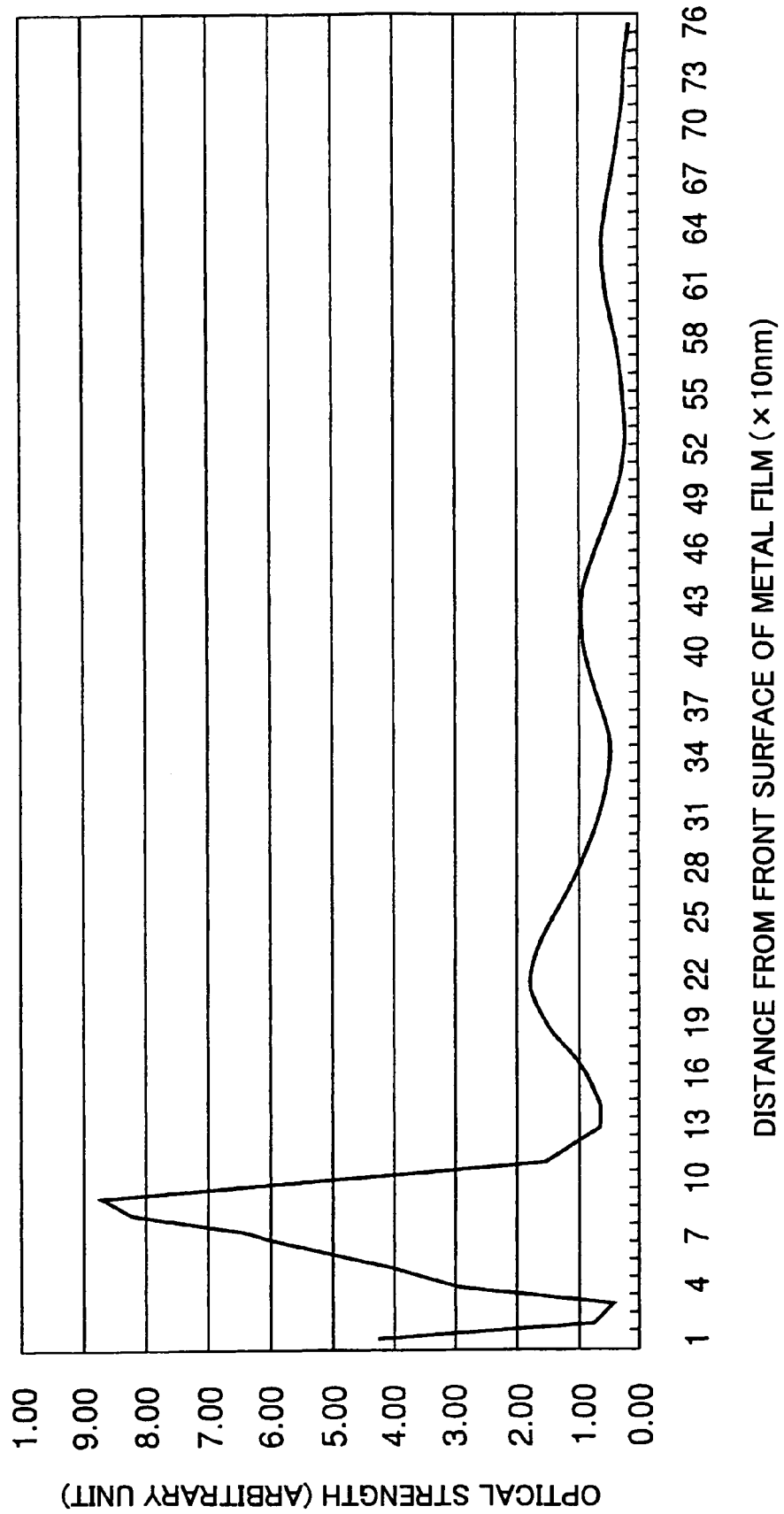
FIG. 5 is a diagram showing a distribution of optical strength from a metal film of a high density optical recording medium according to an embodiment of the present invention.

FIG. 5 shows the optical strength when calculating with the model in FIG. 4. As shown in FIG. 5, the electric field strength (light) is maximum in an area situated apart from the tip portion of the optical near field generation film 202 at a distance of 80 nm (40 nm from the border between the optical near field generation film 202 and the protection film 203). This area is the optical near field area. The calculation shows that the optical strength does not acutely decrease at the border between the optical near field generation film 202 and the protection film 203, and that the portion of maximum optical strength is situated in the optical near field area. In the calculation, the diameter of the condensed beam becomes 50 nm in the track direction, to thereby enable a fine recording in the track direction. According to configuration, the optical strength may become maximum at a portion immediately after the optical near field generation film 202. For such a case, the protection film 203 may be formed immediately before the optical near field generation film 202.

It is to be noted that transmittance is 3% at the strength center in a case where a spherical wave is incident on a typical flat gold metal thin film with a thickness of 40 nm. However, in a case of using a tapered metal thin metal film, being mainly composed of gold (Au) and having the thickness shown in FIG. 4, transmittance is increased 43 times, thereby enabling high speed recording and high speed data transfer. In this example, the cross-talk with an adjacent track is −26 dB (1/20). Therefore, problems such as cross-talk, cross-erase, and cross-write do not occur.

Accordingly, since a fine beam surpassing the limits of diffraction can be generated by using the optical near field, recording and/or reproduction of signals can be performed with high optical strength and with little cross-talk.

By optimizing the wavelength of the laser by utilizing the phenomenon of plasmon resonance of free electrons of metal, or optimizing track pitch, light use efficiency can be further improved. Moreover, light use efficiency can also be further improved by adjusting, for example, the angle or height of the metal film.

Figure 6:
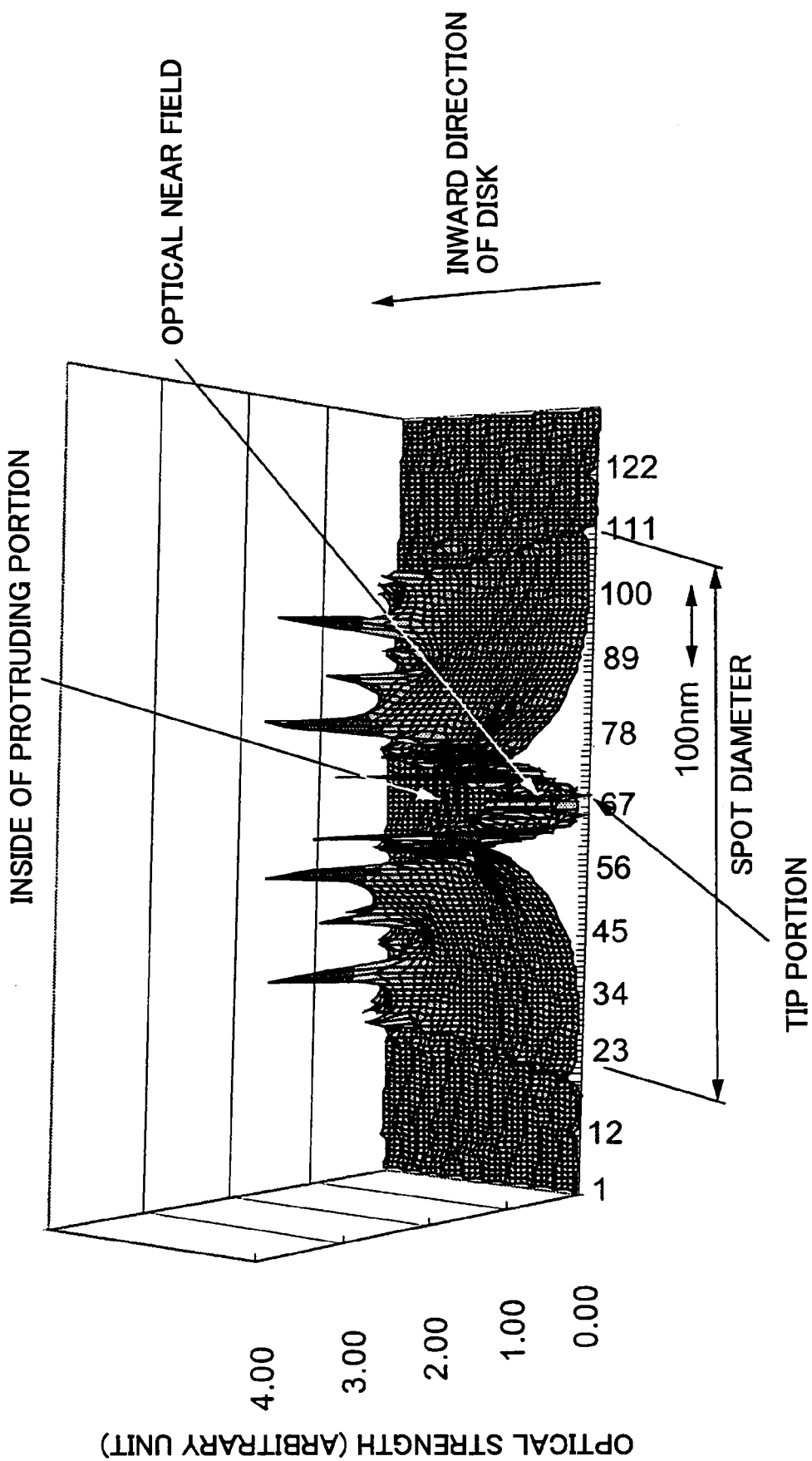
FIG. 6 is a diagram showing a distribution of electric field (light intensity) in a case where a laser beam is condensed to a tip part of a protruding portion of a high density optical recording medium according to an embodiment of the present invention.

In order to narrow the pitch between the tracks for increasing density, the tracks may be formed with varied (adjusted) height between the adjacent tracks. Here, calculation of optical strength is performed using a medium with tracks of adjusted height such as the medium shown in FIG. 2. In this case, the difference in the height of adjacent tracks is set to 0.65 λ/n, in which n is the refractive index of the medium. Thereby, cross-talk between adjacent tracks can be sufficiently reduced even if track pitch is narrowed. FIG. 6 shows the optical strength where a laser beam is condensed onto the tapered tip portions of the tracks (toward the side of the incident surface), wherein the track pitch is 250 nm. The cross-talk in the tracks situated toward the side of the incident surface (so-called land portion) is −26 dB (1/20). Therefore, problems such as cross-talk, cross-erase, and cross-write do not occur. In addition, the cross-talk in the tracks situated away from the side of the incident surface (so-called groove portion) is also −26 dB (1/20). Therefore, problems such as cross-talk, cross-erase, and cross-write do not occur.

The reason for such reduced cross-talk owes to the fact that a condensed beam being incident on the tapered tip portion of the metal film causes intensification of the electrical field and allows the strength of an incident wave to concentrate toward a center area, to thereby cause the beam diameter that was originally 0.95 μm (1/e$^2$) to be narrowed to approximately 0.5 μm (see FIG. 6). Furthermore, the metal film shields the light irradiated to a side surface of a track or to an adjacent track. In addition, the metal film has a thickness that prevents heat from penetrating the protection film and reaching the recording film. It is preferable to optimize the inclination angle of the tip portion for further reducing cross-talk, for example, forming the apex angle of the tip portion to an angle of no more than 90 degrees (however, 0 degrees not included), more specifically, to an angle between approximately 30 to 90 degrees.

Furthermore, the inclined surfaces of the tapered protruding parts may be provided with different (varied) inclination angles among three or more tracks. By varying the angles, cross-talk can be further reduced. It is to be noted that the parameters used in this calculation are the same as those used in the calculation with the model of FIG. 4.

In this example, the calculated $\lambda/NA$, serving to define the beam diameter, is 0.975. In a case supposing that a blue-violet laser diode with a wavelength ($\lambda$) of 400 nm and an objective lens with a numerical aperture (NA) of 0.85 are used, the obtained $\lambda/NA$ would be 0.47, and a track pitch of 120 nm would be obtained. Thereby, a high density recording medium with a track pitch that is several times narrower than the conventional track pitch can be obtained.

Figure 7:
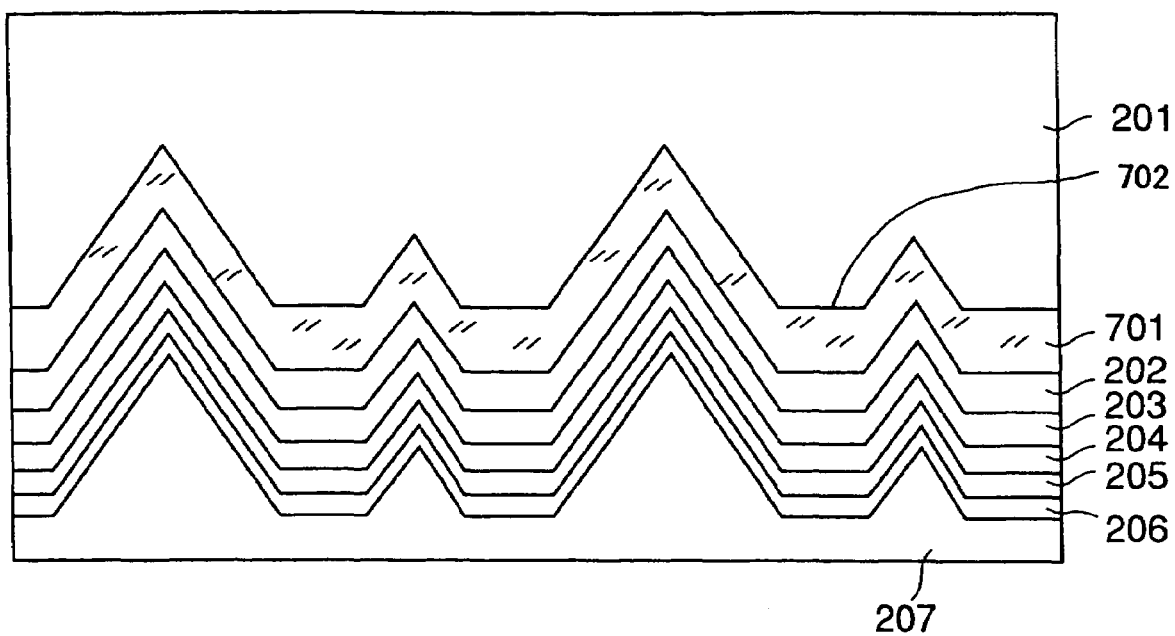
FIG. 7 is a schematic diagram showing a high density optical recording medium according to another embodiment of the present invention.

FIG. 7 shows a high density optical recording medium according to another embodiment of the present invention. The high density optical recording medium in the embodiment shown in FIG. 7 serves to further reduce cross-talk between adjacent tracks. In the embodiment shown in FIG. 7, like components are denoted by like reference numerals as of FIG. 2. The high density optical recording medium has a dielectric film 701 of high refractive index (higher than that of the protection layer or the substrate 201) disposed between the substrate 201 and the optical near field generation film 202, and a flat portion 702 interposed between the protruding parts. The dielectric film 701 is formed of, for example, ZnS having a refractive index of approximately 2.2. The dielectric film 701 serves to prevent the light conventionally diffused to tracks beside the target recording/reproduction track from diffusing to adjacent tracks by having the light bent by refractive index difference. It is to be noted that a track pitch of no more than 100 nm can be obtained in a case where the present invention is applied to a magnetic optical disk using magnetic super resolution, which can permit a relatively large amount of cross-talk. Furthermore, the high density optical recording medium according to the present invention can serve as a removable medium since the recording medium has no head/disk interface problem. In a case of reproduction using an optical super resolution method, a light-shielding member is disposed at a center portion of the condensing area and an optic super resolution lens for reducing optical strength at the center portion is employed, so that reproduction can be performed where the optical strength at the center portion of the beam spot on the reproduction/recording surface is lower than the portion surrounding the center portion.

A method for optically reproducing information by using an optical super resolution lens is described in Japanese Laid-Open Patent Application No. 7-6379. In accordance with the method described in Japanese Laid-Open Patent Application No. 7-6379, reproduction of information using optical super resolution can be achieved by disposing a light shielding plate between the $\lambda/2$ plate and the condensing lens 113 (see FIG. 1).

Figure 8:
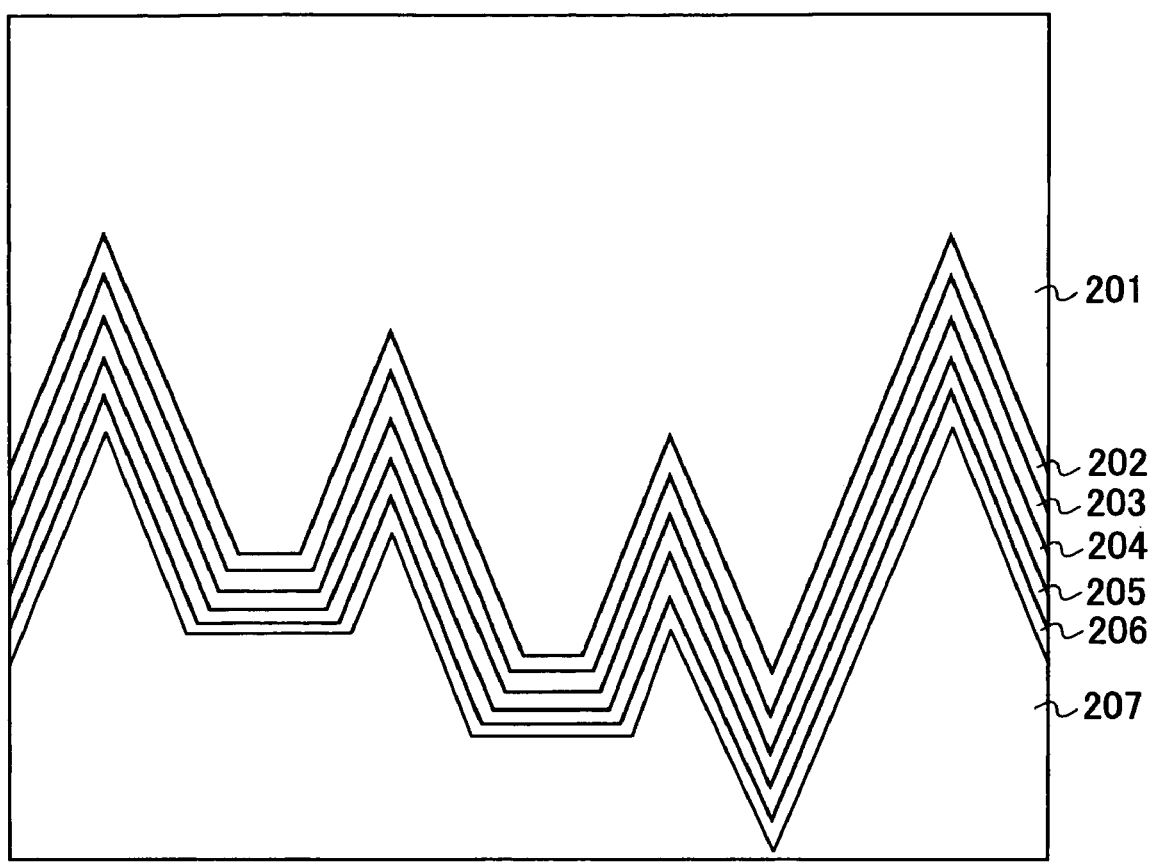
FIG. 8 is a schematic diagram showing a high density optical recording medium according to another embodiment of the present invention.

FIG. 8 shows a high density optical recording medium according to another embodiment of the present invention. In the embodiment shown in FIG. 8, like components are denoted by like reference numerals as of FIG. 2. The high density optical recording medium shown in FIG. 8 has various tracks with different heights for adjacent tracks.

In this case, adjacent tracks refer not only to tracks that are disposed on both sides of a target track, but also to a number of tracks disposed within a prescribed area. By adjusting (varying) the height of the adjacent tracks, cross-talk between adjacent tracks can be reduced. In this case, the apex angle of the inclinations between adjacent tracks may also be adjusted (varied).

Figure 9:
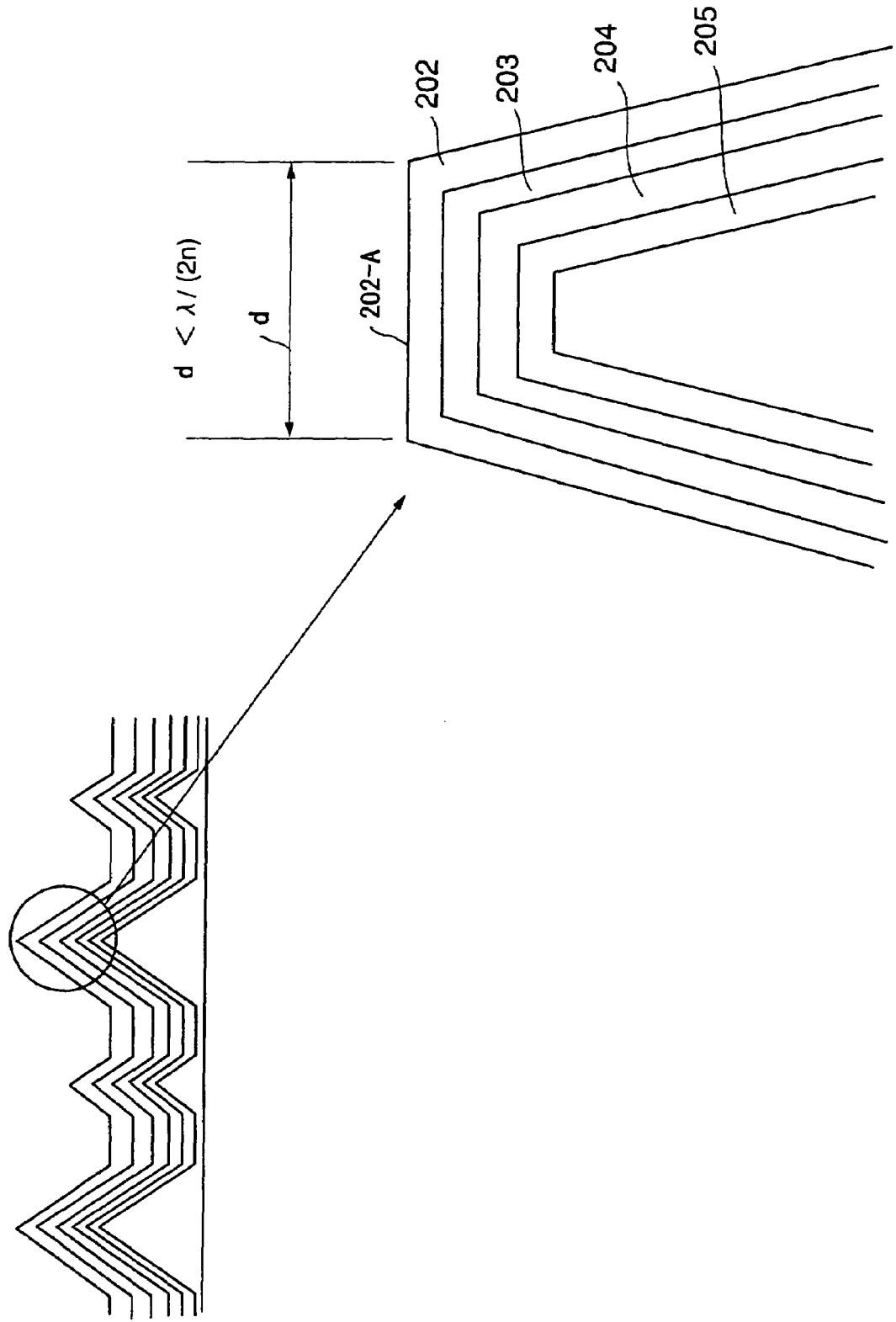
FIG. 9 is a schematic diagram showing a high density optical recording medium according to another embodiment of the present invention.

FIG. 9 shows a high density optical recording medium according to another embodiment of the present invention. In the embodiment shown in FIG. 9, like components are denoted by like reference numerals as of FIG. 2. In the high density optical recording medium shown in FIG. 9, a tip portion of a track has a flat shape. Although the track is formed with a tapered tip portion, an optical near field can be generated where the tip portion of a track alternatively has a flat part 202-A. It is, however, preferable for the length of the flat part d to be no more than $\lambda/(2n)$ (however, 0 not included) where the wavelength of the laser beam is $\lambda$, and where the refractive index of the optical near field generation film is n.

Figure 10A:
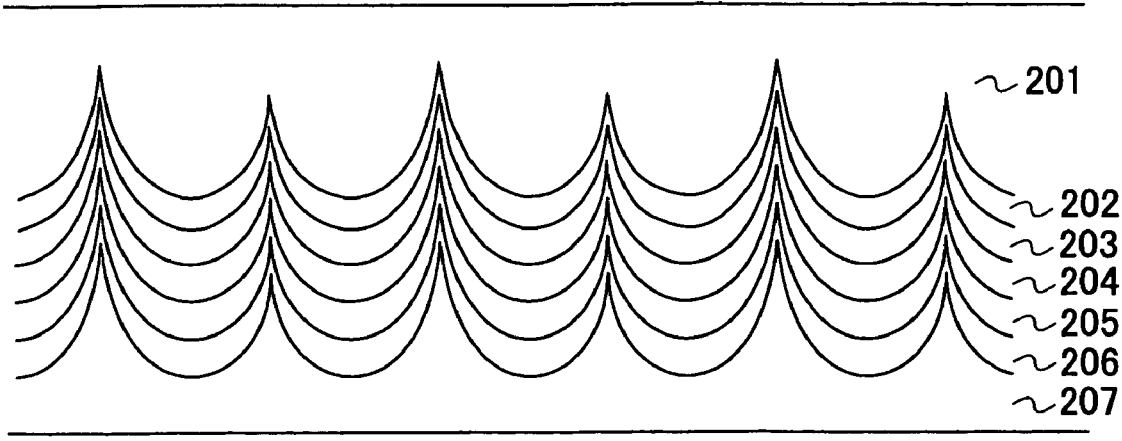
FIGS. 10A-10C are schematic diagrams showing a high density optical recording medium according to another embodiment of the present invention.
Figure 10B:
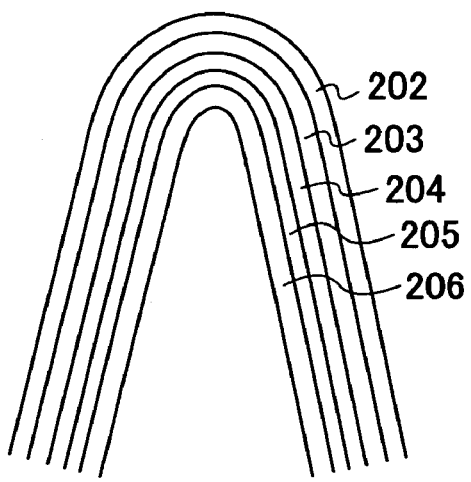
Figure 10C:
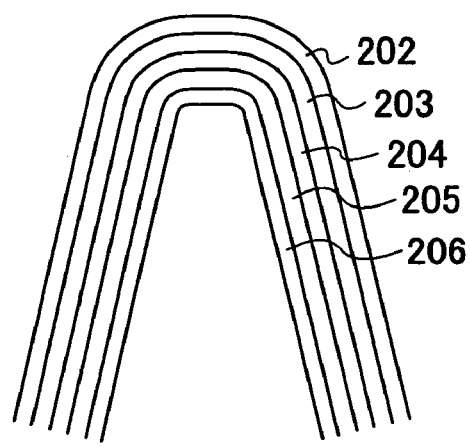

FIGS. 10A-10C show a high density optical recording medium according to another embodiment of the present invention. In the embodiment shown in FIG. 10A-10C, like components are denoted by like reference numerals as of FIG. 2. In the high density optical recording medium of this embodiment, the side surface of the tracks are formed with curvatures. This recording medium, having a side surface with no fixed inclination and a tip portion (apex portion) serving as an inflexion point, is also able to generate an optical near field. As shown in FIG. 10B, the tip portion of the track can be formed in a parabolic shape. Alternatively, as shown in FIG. 10C, a corner portion (where the tip portion is relatively flat) may be formed with a curvature. Further, the high density optical recording medium may be obtained by providing a gap at a plastic substrate. Accordingly, the high density optical recording medium of the present invention can be obtained even with a material with a small refractive index.

Figure 11:
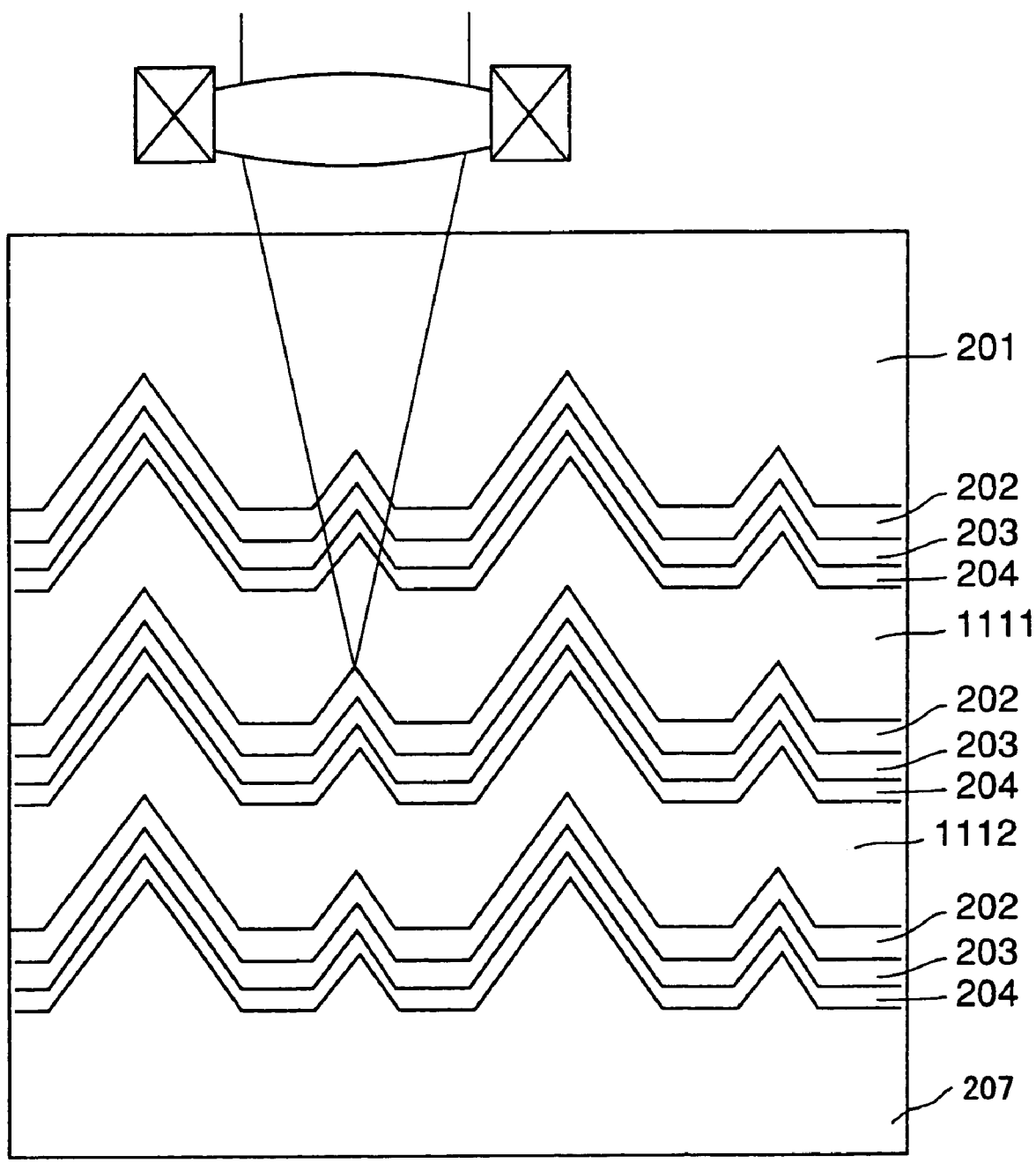
FIG. 11 is a schematic diagram showing a high density optical recording medium according to another embodiment of the present invention.

FIG. 11 shows a high density optical recording medium according to another embodiment of the present invention. The high density optical recording medium of FIG. 11 has plural layers of the optical near field generation film provided in the thickness direction of the recording medium, in which the layers are separated by separation layers 1111, 1112. In the embodiment shown in FIG. 11, like components are denoted by like reference numerals as of FIG. 2. In this embodiment, recording density of the recording medium can be enhanced in proportion to the number of layers. For example, each layer of recording film 204 is a magnetic optical recording film. Recorded signals are read by using the magnetic field generated from the optical near field in each recording film 204. For example, as described in the Technical Digest of Magneto Optical Recording International Symposium (MORIS) (1999, p. 164-165), TbFeCo may be used as the recording film. This recording medium has little residual magnetization at room temperature, and hardly leaks any magnetic flux; however, magnetic signals can be detected with a magnetic head for reproduction since residual magnetization increases when a laser beam is condensed to a desired reproduction portion. As shown in FIG. 11, a UV curable resin, a dielectric material, or an aluminum material, for example, may be disposed as the separation layers 1111, 1112 interposed between each of the recording layers formed of the optical near field generation film 202, the protection film 203, and the recording film 204, to thereby prevent interference between the layers.

As described above, when a laser beam is condensed to the layer of the optical near field generation film 202, an optical near field is generated in the recording film 204, thereby allowing signals to be recorded to the recording film 204. Further, in a case of reproducing the signals recorded to the recording film 204, a laser beam is condensed to the layer of the optical near field for generating an optical near field in the recording film 204, thereby increasing residual magnetization to allow a magnetic head for reproduction to detect magnetic signals. Although reproduction of signals is described with a magnetic reproduction technique, reproduction of signals may alternatively be performed with an optical reproduction technique. Although the above-described embodiments according to the present invention have been described using an magneto optical recording technique (magneto optical recording film), the present invention may alternatively be applied to a phase change recording technique (phase change recording film) for recording/reproduction of signals.

Figure 12:
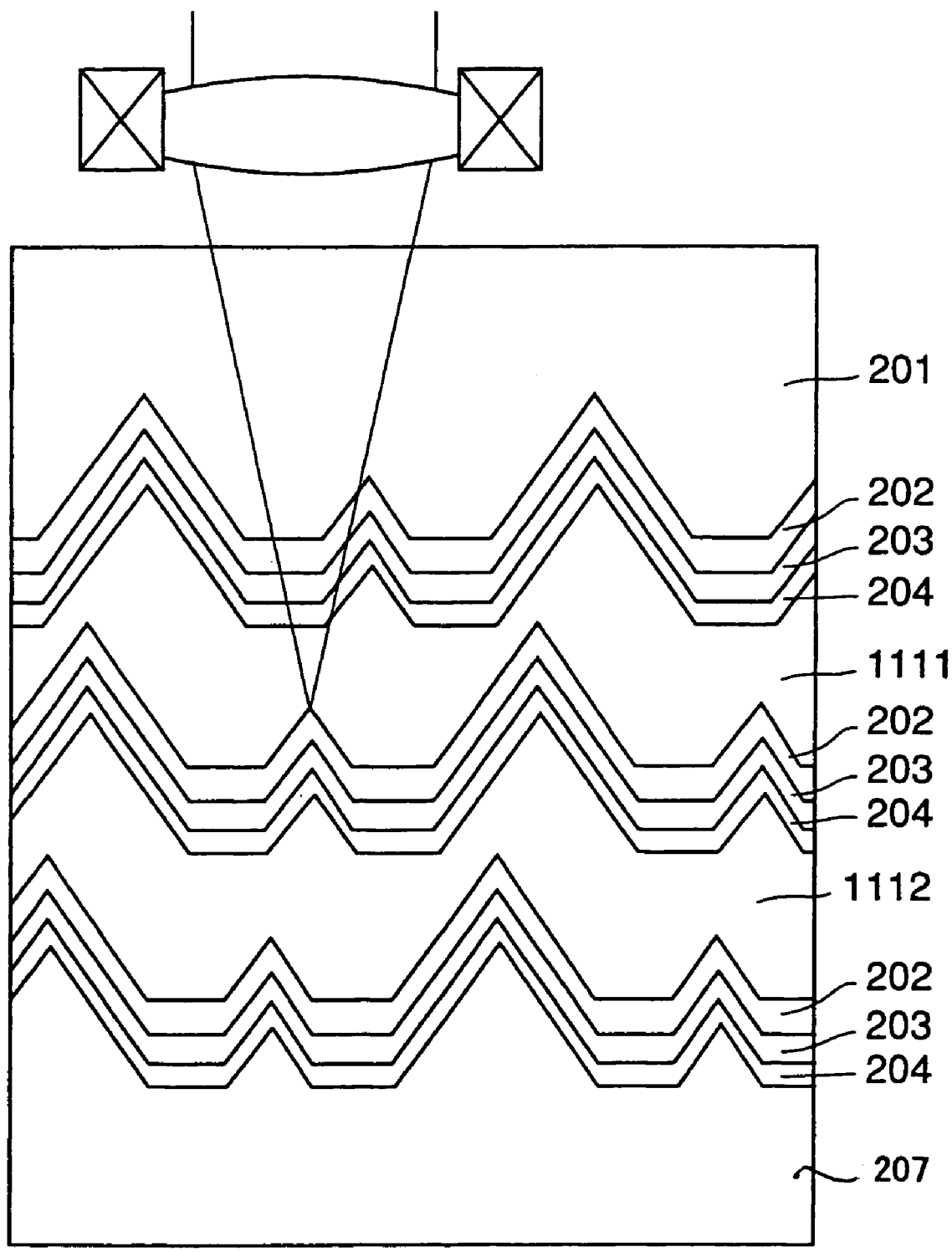
FIG. 12 is a schematic diagram showing a high density optical recording medium according to another embodiment of the present invention.

FIG. 12 shows a high density optical recording medium according to another embodiment of the present invention. The high density optical recording medium in the embodiment shown in FIG. 12 has a structure similar to that of the embodiment shown in FIG. 11 where plural layers including the optical near field generating film are provided; however, in the embodiment shown in FIG. 12, the tracks are disposed at positions deviating from each other in the radial direction. With the arrangement of the embodiment of FIG. 12, light-use efficiency can be effectively achieved. Nevertheless, the same as the embodiment shown in FIG. 11, this embodiment also enables recording/reproduction of signals for each layer.

In the above-described embodiments, the optical near field generation film may be formed with aluminum, in which the film is annealed with heat. By employing aluminum for the optical near field generation film, manufacturing cost can be reduced. Furthermore, since the use of aluminum enhances transmittance at the tip portion, light-use efficiency can be improved.

Figure 13:
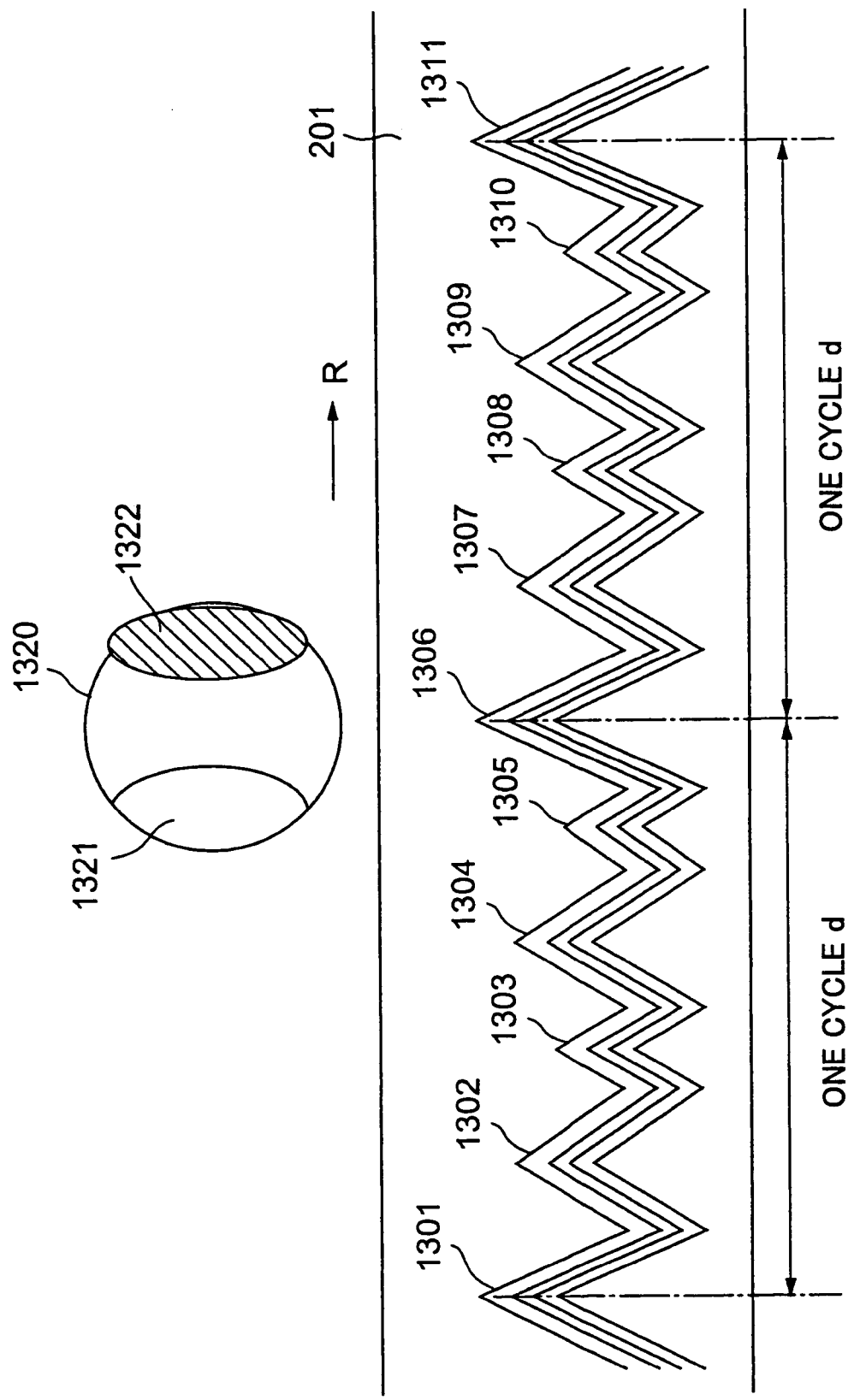
FIG. 13 is a schematic diagram showing a high density optical recording medium according to another embodiment of the present invention.

FIG. 13 shows a high density optical recording medium according to another embodiment of the present invention. The high density optical recording medium shown in FIG. 13 is able to obtain radial push-pull signals as tracking signals. The arrow R shown in FIG. 13 indicates a radial direction of the optical disk (track-crossing direction). In this embodiment, a single cycle (track group) has a number (N) of tracks with protrusions of different height (for example, tracks 1301, 1302, 1303, 1304, and 1305 in FIG. 13). Accordingly, tracks of the optical disk are formed by repeating the formation of the aforementioned track group in which tracks with heights corresponding to those of the aforementioned track group (for example, tracks 1306, 1307, 1308, 1309, and 1310) are formed in the radial direction of the optical disk. In FIG. 13, the distance between the track 1301 and the track 1306 is the distance of a single cycle d. Furthermore, in FIG. 13, numeral 1320 is a beam spot of a laser beam incident on the tracks, and numerals 1321 and 1322 are patterns of the beam spot formed from reflected light.

Here, the track of the optical disk is formed to satisfy a relation of $\lambda/d<1$, where $\lambda$ is the wavelength of the laser beam of the beam spot 1320, and d is the distance of a single cycle. When the relation is satisfied, ±1 (first) diffracted light is generated. By forming the tracks in such manner, the patterns of the beam spot of the diffracted light change according to the degree (amount) of displacement of the center of the incident beam spot 1320 with respect to the center of each track (for example, pattern 1321 or 1322 in FIG. 13). The second photo detector 111 shown in FIG. 1 detects the pattern changes of the diffracted light, and the degree (amount) of the displacement of the center of the incident beam spot 1320 with respect to the center of each track. According to the detected amount, the track control system 150 performs tracking control, in which the track actuator 151 is driven to adjust the position of the objective lens 105 shown in FIG. 1 in the radial direction (track crossing direction).

Figure 14:
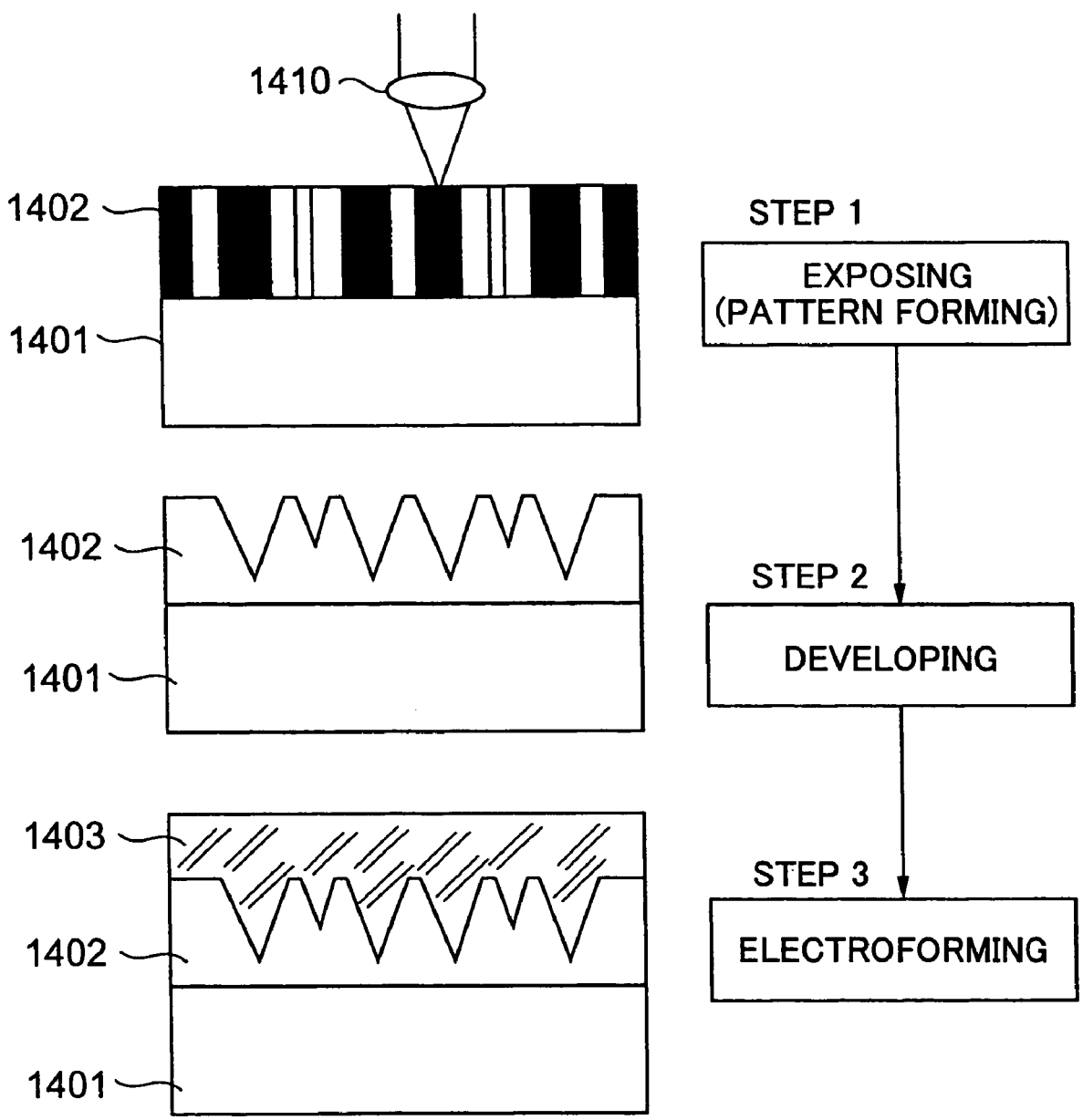
FIG. 14 is a schematic diagram showing a method of manufacturing a high density optical recording medium according to an embodiment of the present invention.

Next, a method of manufacturing the high density recording medium according to the present invention is described. FIG. 14 illustrates a mastering process. In Step 1, a resist material 1402 (e.g. photo resist or resist material employed for electron beam) is coated on a substrate 1401 (e.g. quartz). Portions of the coated resist 1402 targeted for forming the tracks are exposed by using a laser mastering apparatus or an electron beam lithography apparatus, in which a laser beam or an electron beam is irradiated thereto via a lens 1410, to thereby form track patterns. Although a laser beam having a wavelength of 250 nm is typically employed for exposure of resist, an electron beam may be employed depending on track pitch, such as a case of forming a narrow track pitch of no more than 100 nm. In a case of forming tracks with adjusted (varied) height, exposure is performed by altering exposure intensity of the laser beam or the electron beam, lithographic speed, and/or focal position. Accordingly, the shapes of the grooves can be altered. Next, in Step 2, the exposed resist material 1402 is developed, to thereby form tracks having tapered tip portions. The cross-sectional shapes of the tracks can be adjusted by controlling, for example, the resist or conditions of development. Last, in Step 3, a stamper 1403 is formed by electroforming.

After the stamper 1403 is formed, a substrate is formed by injection molding, then, layers including, for example, an optical near field generation film, a protection film (e.g. SiN), and/or a recording film (e.g. TbTeCo) are formed as described with the high density optical recording medium according to the embodiments of the present invention, and then another protection film is formed, thereby obtaining a replication disk. This method can be performed by utilizing existing apparatuses and installations for manufacturing a stamper of an optical disk, thereby incurring little manufacturing cost.

Figure 15:
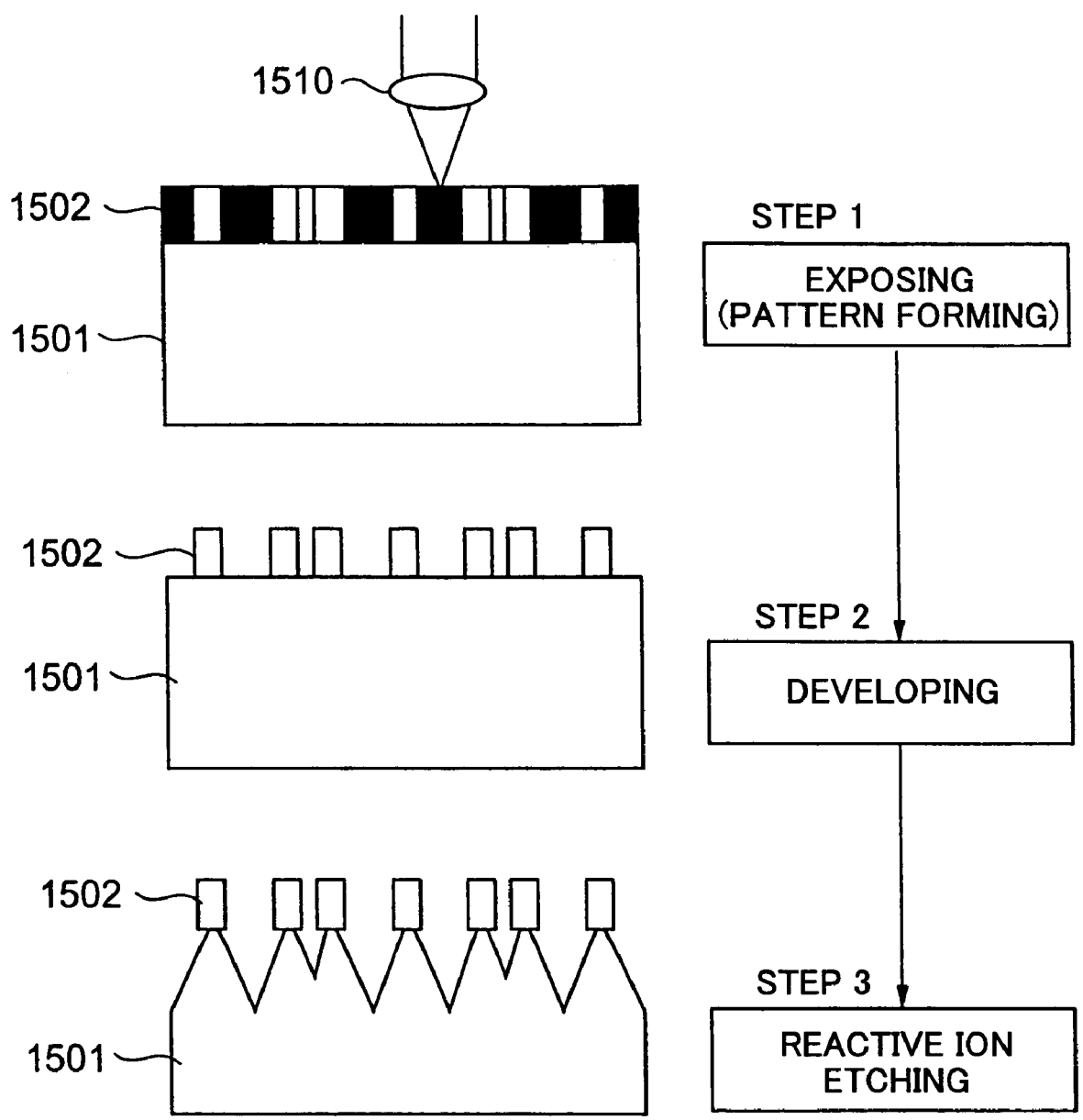
FIG. 15 is a schematic diagram showing a method of manufacturing a high density optical recording medium according to another embodiment of the present invention.

Next, another method of manufacturing a high density recording medium according to an embodiment of the present invention is described. FIG. 15 shows a mastering process using an RIE (Reactive Ion Etching) technique. As described above, the tip portion has a pointed shape. The diameter of the mark to be recorded is determined according to how pointed the tip portion is.

In Step 1, a resist material 1502 (e.g. photo resist or resist material employed for electron beam) is coated on a substrate 1501 (e.g. quartz). Portions of the coated resist 1502 targeted for forming the tracks are exposed by using a laser mastering apparatus or an electron beam lithography apparatus, in which a laser beam or an electron beam is irradiated thereto via a lens 1510, to thereby form track patterns. In a case of forming tracks with adjusted (varied) height, exposure is performed by altering the width of exposure patterns. Next, in Step 2, the exposed resist material 1502 is developed, and the resist corresponding to the target track portions is removed. Next, in Step 3, by using a dry etching technique such as the aforementioned RIE technique, tracks with tapered tip portions can be formed. Last, the remaining resist material 1502 is removed to form a stamper 1501.

After the stamper 1501 is formed, a substrate is formed by injection molding, and a replication disk is obtained in the same manner described with the embodiment shown in FIG. 14.

Next, another method of manufacturing a high density recording medium according to an embodiment of the present invention is described. Similar to the embodiment shown in FIG. 15, FIG. 16 shows a mastering process using an RIE (Reactive Ion Etching) technique. In this embodiment, however, in a case of forming tracks with adjusted (varied) height, exposure is performed by altering the intensity of the laser beam or electron beam used for the exposure (Step 1). As shown in Step 2 in FIG. 16, the resist 1602 remaining after the developing procedure can be formed having different thickness in correspondence with the height of the tracks. Next, in Step 3, by using a dry etching technique such as the aforementioned RIE technique, tracks with tapered tip portions can be formed. Lastly, the remaining resist material 1602 is removed to form a stamper 1601.

After the stamper 1601 is formed, a substrate is formed by injection molding, and a replication disk is obtained in the same manner described with the embodiment shown in FIG. 15.

Conventionally, embossments are formed for recording addresses for recording/reproduction to a blank disk, for example, a ROM disk. The present invention, however, does not form embossments for recording such addresses during a manufacturing process of an optical disk. With the present invention, after the replication disk is formed, a memory apparatus performs an initial formatting procedure where the memory apparatus records data to the disk with a typical data recording (optical recording or magneto optical recording) technique. For example, in a case of recording addresses at a factory, when a control part (e.g. optical disk controller and microprocessor) of the memory apparatus receives format information (e.g. address information), the control part performs recording control by using a low power beam for tracing tracks and a high power beam for sequentially recording the information in a predetermined portion at a predetermined clock timing.

For example, in a case where a user of an optical disk apparatus records address information at the same time of formatting, address information stored in a memory of the memory apparatus is read out when the control part of the memory apparatus receives a format command from a host apparatus, so that the control part performs recording control by using a low power beam for tracing tracks and a high power beam for sequentially recording the address information on a predetermined portion at a predetermined clock timing. In such manner, the process of manufacturing a recording medium can be simplified.

Figure 17:
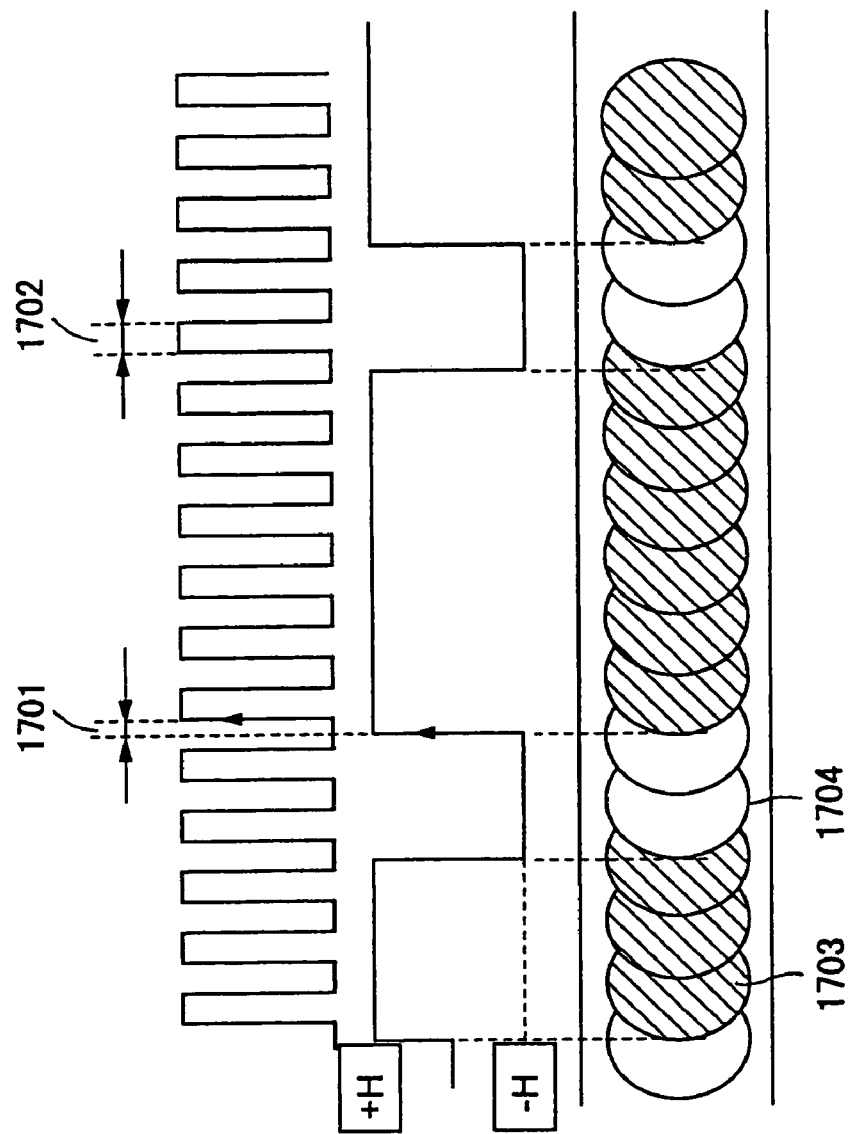
FIGS. 17A-17C are schematic diagrams for explaining a laser pulse magnetic field modulation according to an embodiment of the present invention.

Next, an example for attaining high density in a tangential direction (scanning direction of a beam spot) of a track is described. FIG. 17 shows an example for modulating the magnetic field and laser pulse for a magnetic optical disk. FIG. 17A shows a laser pulse irradiating during recording, FIG. 17B shows an external magnetic field corresponding to recording signals, and FIG. 17C shows recording patterns formed on a recording medium. In FIG. 17C, numeral 1703 is a pattern recorded when the external magnetic field is +H, and numeral 1704 is a pattern recorded when the external magnetic field is −H. The external magnetic field corresponds to the information that is to be recorded. By using laser pulses, such as numeral 1702, indicating proportion of ON and OFF, and delaying (as indicated with numeral 1701 in FIG. 17B) between of the change points of the external magnetic field and a starting point of the laser pulse, the patterns shown in FIG. 17C can be recorded on the recording medium. In recording by modulation of magnetic field and laser pulse, crescent moon shaped patterns as shown in FIG. 17C can be recorded on the recording medium, to thereby attain high density in a tangential direction of a track (track direction). Furthermore, this modulating technique can be used for overwrite recording, to thereby achieve faster recording and/or reproduction.

Figure 18:
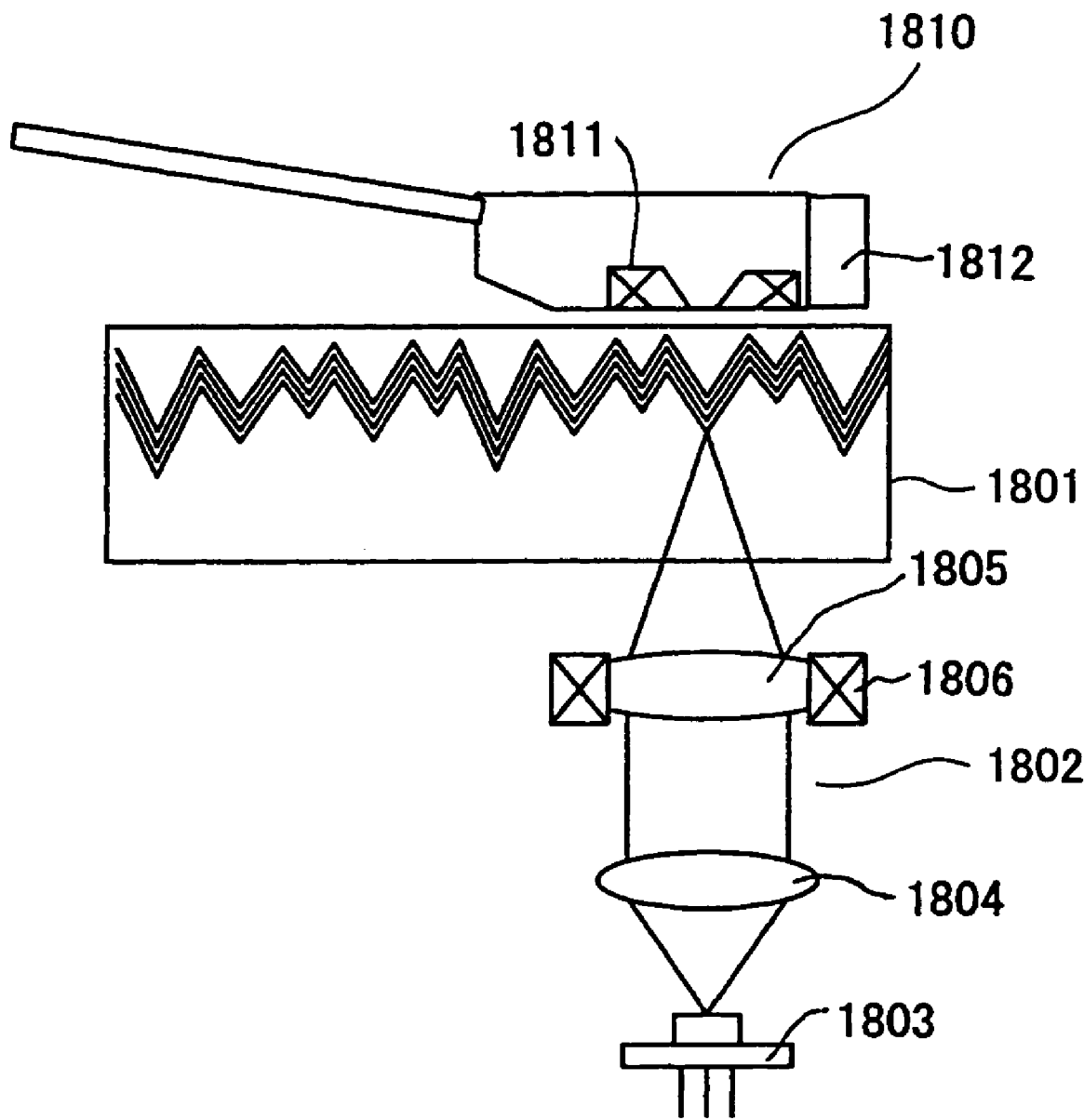
FIG. 18 is a schematic diagram showing an optic head and a magnetic head according to an embodiment of the present invention in a case where the numerical aperture (NA) of the optic head is small.

FIG. 18 shows an example of an optical head and a magnetic head in a case of recording/reproducing by using the example of the modulating magnetic field and laser pulse shown in FIG. 17. In FIG. 18, an optical head 1802 includes, for example, a laser diode 1803, a collimator lens 1804, an objective lens 1805, and an actuator 1806 serving to move the objective lens 1805. The laser beam irradiated from the laser diode 1803 is converted to a parallel beam by the collimator lens 1804, and is condensed to the recording surface of an optical disk 1801 by the objective lens 1805. The focus control system 140 (see FIG. 1) controls the position of the focal point of the condensed light by driving the actuator 1806 so as to condense the light beam onto the tip protruding portion of the tracks of the optical disk 1801.

In a case where the numerical aperture (NA) of the optical head 1802 is small, a floating slider 1810 including a recording coil 1811 and a reading head 1812 is disposed on the opposite side of the optical head 1802 where the optical disk 1801 is situated therebetween. The recording coil 1811 of the floating slider 1810 performs modulation of magnetic field, to thereby record data on the optical disk 1801. In a case where the optical disk 1801 has a high density, a recording magnetic head with, for example, GMR (Giant Magnetic Resistance) or TMR (Tunnel Magnetic Resistance) may be used.

As an example of a GMR head, a spin-valve magnetic resistance head may be employed, as shown in Japanese Laid-Open Patent Application No. 10-340430. As an example of a TMR head, a magnetic head including, for example, a first magnetic layer, an insulation layer, and a second magnetic layer may be employed, as shown in Japanese Laid-Open Patent Application No. 2001-229515.

Figure 19:
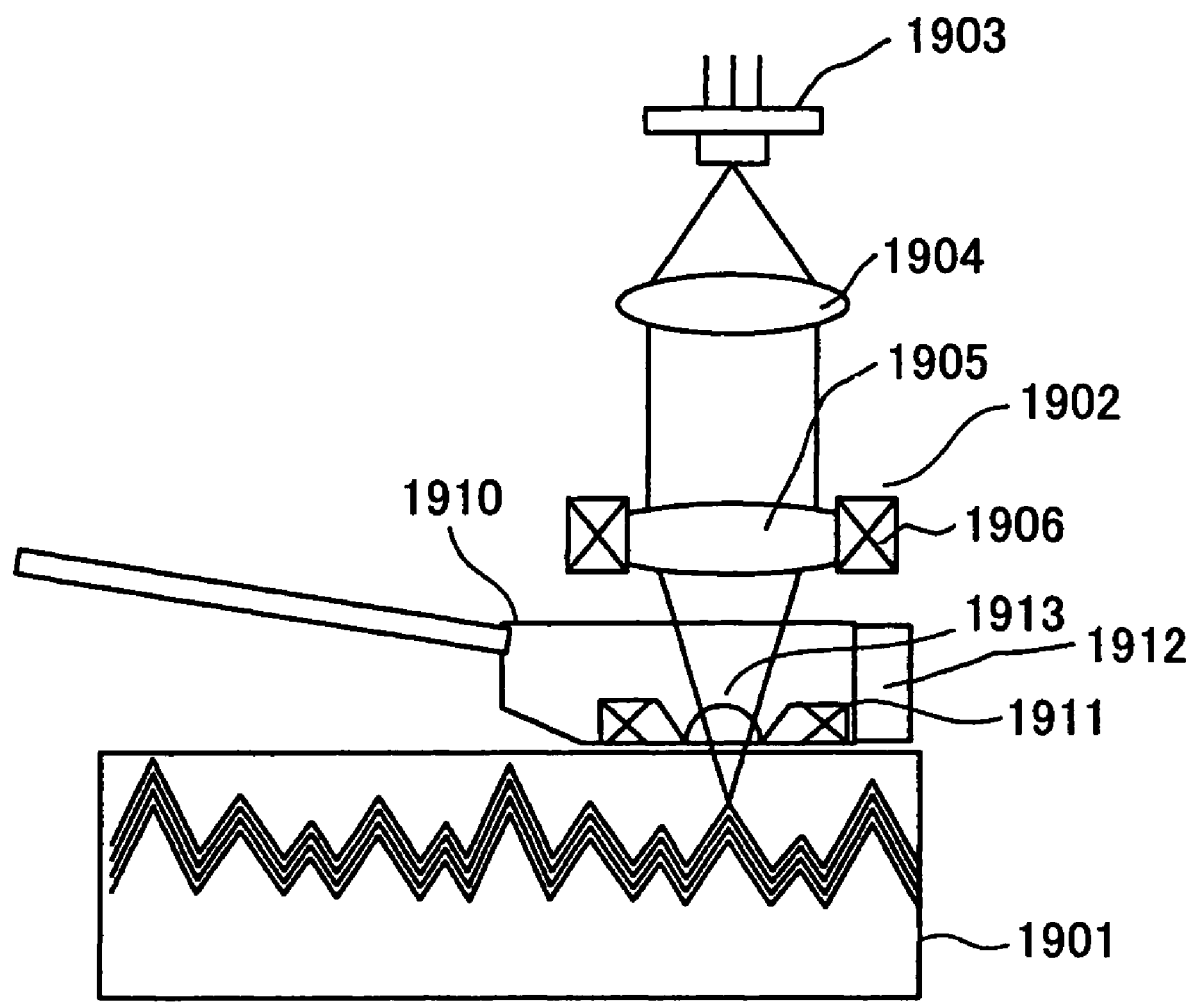
FIG. 19 is a schematic diagram showing an optic head and a magnetic head according to an embodiment of the present invention in a case where the numerical aperture (NA) of the optic head is large.

FIG. 19 shows another example of an optical head and a magnetic head in a case of recording/reproducing by using the example of a modulating magnetic field and laser pulse shown in FIG. 17. In FIG. 19, an optical head 1902 includes, for example, a laser diode 1903, a collimator lens 1904, an objective lens 1905, and an actuator 1906 serving to move the objective lens 1905. In a case where the numerical aperture (NA) of the optical head 1902 is large, a floating slider 1910 including an air-core recording coil 1911, a reading head 1912, and a lens 1913 in the air-core is disposed on the same side of the optical head 1902 with respect to the optical disk 1901. Alternatively, a magnetic field modulation magnetic head may be disposed on the side where light is incident on the medium, and an optical head may be used for reproduction.

Figure 20:
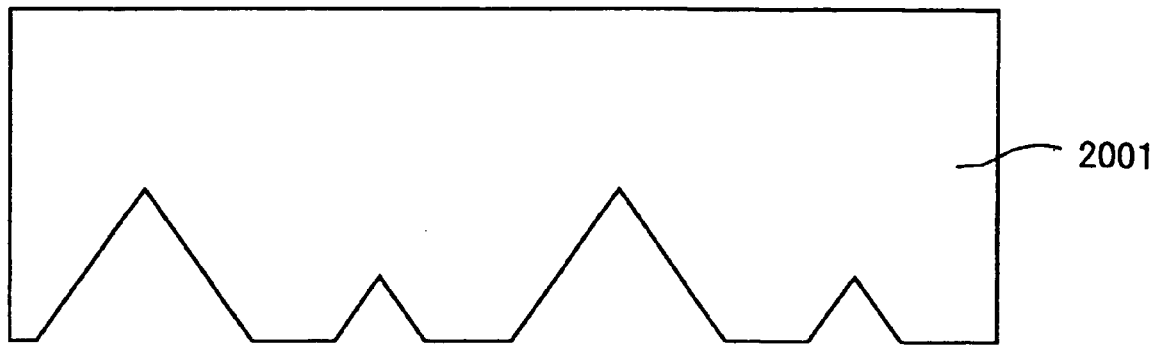
FIG. 20 is a schematic diagram showing an optical disk substrate according to an embodiment of the present invention in a case where the numerical aperture (NA) of an optic head is small.

FIG. 20 shows a substrate of a high density recording medium (optical disk) used in a case where an optical head has a small numerical aperture (NA), as in the example described in FIG. 18. A high density recording medium used for a case where an optical head has a small numerical aperture (NA) can be formed by stacking films onto a substrate 2001 in an order of an optical near field generation film, a protection film, and a recording film.

Figure 21:
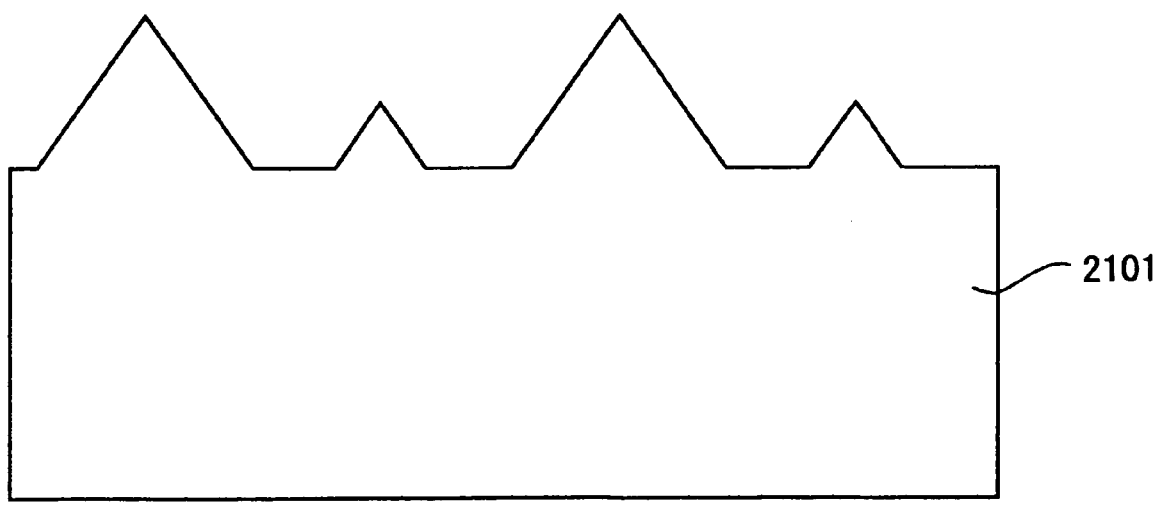
FIG. 21 is a schematic diagram showing an optical disk substrate according to an embodiment of the present invention in a case where the numerical aperture (NA) of an optic head is large.

FIG. 21 shows a substrate of a high density recording medium (optical disk) used in a case where an optical head has a large numerical aperture (NA), as in the example described in FIG. 19. A high density recording medium used for a case where an optical head has a large numerical aperture (NA) can be formed by stacking films onto a substrate 2101 in an order of a recording film, a protection film, and an optical near field generation film. In manufacturing an original disk of such a high density recording medium, a device having a protruding shape (e.g. cantilever) may be employed for condensing a laser beam onto a protruding recording surface, to thereby obtain the high density recording medium.

Alternatively, in another example, a resist material may be disposed on a quartz substrate, and the resist can be exposed to form exposure patterns thereto. Then, after the exposed resist material is developed, the resist remaining at portions where tracks are to be formed are removed. Next, a dry etching technique such as an RIE technique is applied to form tracks having tapered tip portions. Last, a stamper is formed by removal of the remaining resist material. After the stamper is formed, a substrate for a replication disk is formed by injection molding, and with the above-described procedures, a replication disk is obtained.

Figure 22:
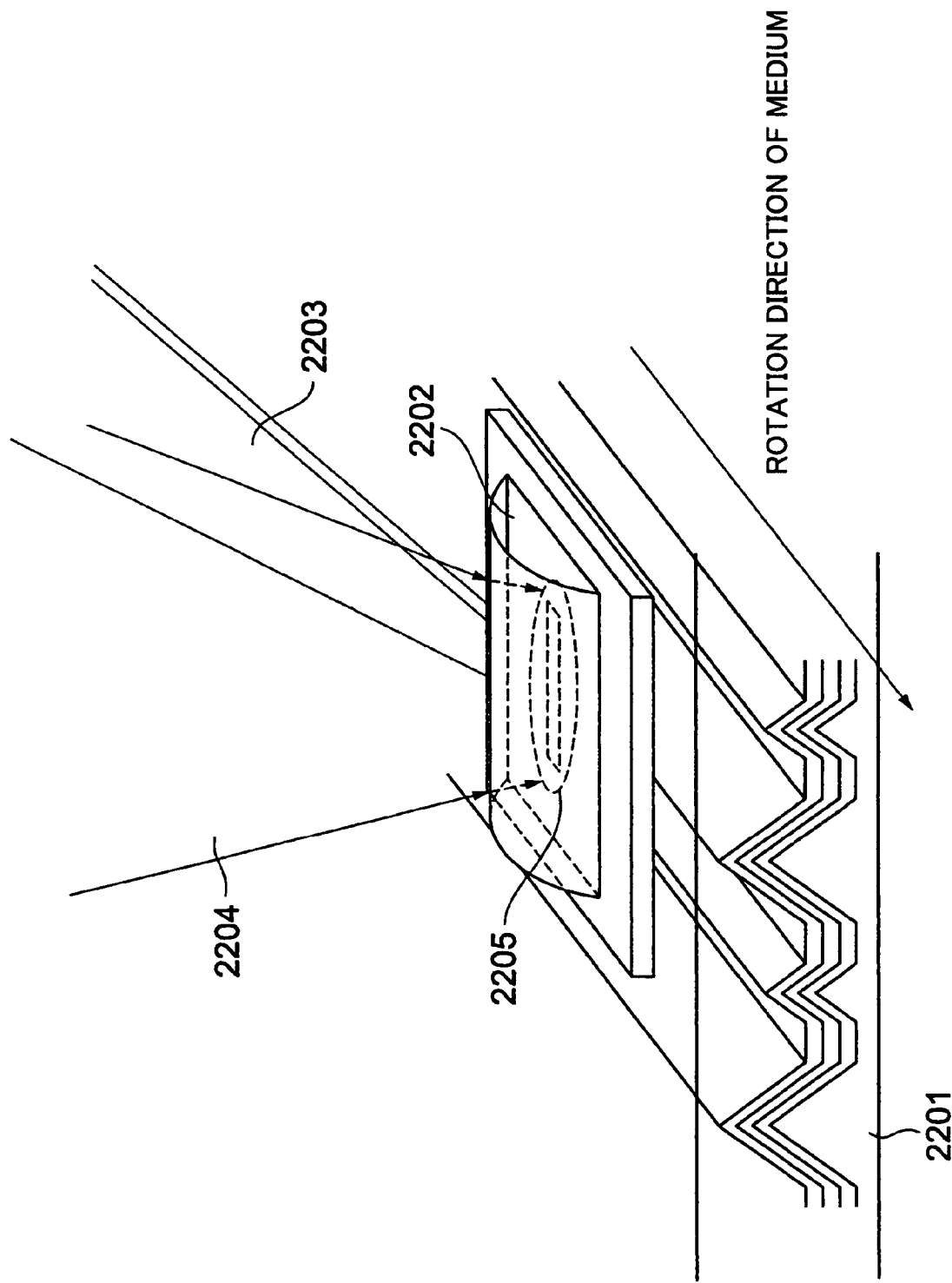
FIG. 22 is a schematic diagram for explaining attainment of high density in a scanning direction of a beam spot according to an embodiment of the present invention.

Next, another example for attaining high density in a tangential direction of a track is described. FIG. 22 shows an example of attaining high density in a tangential direction (scanning direction of a beam spot) of a track by using a cylindrical lens 2202. In FIG. 22, the cylindrical lens 2202, being held by a suspension part 2203, is disposed on the incident surface of an optical disk 2201. The laser beam 2204 incident on the cylindrical lens 2202 becomes a compressed oval spot in a tangential direction (scanning direction of a beam spot) of a track, in which the spot diameter in the tangential direction of the track is shortened. Accordingly, high density in the tangential direction of the track can be attained. Furthermore, by narrowing the laser beam 2204 in the tangential direction by forming a slit with a size of no more than λ/2 at a lower portion of the cylindrical lens 2202 in a tangential direction, the density can be further increased.

In FIG. 23, by disposing an axicon prism 2303 (having an axicon shape only in a tangential direction of an optical disk 2301) between an optical disk 2301 and an objective lens 2302, high density can be attained in a peripheral direction of a track. By using the axicon prism 2303, signals can be recording with a fine beam (having a distribution of a 0 Bessel function). Accordingly, high density can be attained in a tangential direction of a track.

As described above, the present invention, with use of an optical near field, provides a high density optical recording medium, a memory apparatus, a method of recording/reproducing a high density optical recording medium, and a method of manufacturing a high density optical recording medium.

Further, the present invention is not limited to these embodiments, but various variations and modifications may be made without departing from the scope of the present invention.

The present application is based on PCT Application No. 02/01807 filed on Feb. 27, 2002, with the Japanese Patent Office, the entire contents of which are hereby incorporated by reference.

What is claimed is:

1. An optical recording medium having at least a recording film and a protection film disposed on a substrate, the optical recording medium comprising:
   a plurality of recording tracks being disposed, along a predetermined direction, on a signal recording surface to which a laser beam is incident, the recording tracks having tapered protruding portions;
   wherein the protruding portions are formed of an optical near field generation film.

2. The optical recording medium as claimed in claim 1, wherein the optical near field generation film is a metal film.

3. The optical recording medium as claimed in claim 1, wherein the optical near field generation film has a complex permittivity for which at least one of a real part and an imaginary part is a negative value for laser wavelength.

4. The optical recording medium as claimed in claim 1, wherein the optical near field generation film has a complex permittivity for which a real part is a negative value and an absolute value of an imaginary part is smaller than that of the real part for laser wavelength.

5. The optical recording medium as claimed in claim 1, wherein the optical near field generation film has an absolute value of a complex refractive index for which an imaginary part is larger than that of a real part for laser wavelength.

6. The optical recording medium as claimed in claim 1, wherein a distance between the optical near field generation film and the recording film is no more than 1/10 of the wavelength λ of the laser beam incident on the signal recording surface.

7. The optical recording medium as claimed in claim 1, wherein one of the tapered protruding portions has a height that is different from that of another one of the tapered protruding portions.

8. The optical recording medium as claimed in claim 1, wherein one of the tapered protruding portions has an apex angle that is different from that of another one of the tapered protruding portions.

9. The optical recording medium as claimed in claim 1, wherein the tapered protruding portions has an apex angle of 90 degrees or less.

10. The optical recording medium as claimed in claim 1, wherein a flat portion is disposed between two adjacent of the tapered protruding portions.

11. The optical recording medium as claimed in claim 1, wherein a tip portion of one of the tapered protruding portions has a flat part.

12. The optical recording medium as claimed in claim 11, wherein the flat part satisfies a relation of $$d \leq \lambda/(2n),$$

wherein d represents the length of the flat part, n represents the refractive index of the substrate, and λ represents the wavelength of the incident laser beam,
wherein d does not include 0.

13. The optical recording medium as claimed in claim 1, wherein a tip portion of the tapered protruding portions has an inflection point.

14. The optical recording medium as claimed in claim 1, wherein a tip portion of the tapered protruding portions has a curved shape.

15. The optical recording medium as claimed in claim 1, wherein both corners of a tip portion of the tapered protruding portions are curved.

16. The optical recording medium as claimed in claim 1, wherein the height of the tapered protruding portions is changed every cycle,
wherein one cycle has N tracks,
wherein the tracks are disposed to satisfy a relation of λ/d<1, where λ represents the wavelength of the incident laser beam, and d represents a length of one cycle.

17. The optical recording medium as claimed in claim 1, further comprising a plurality of signal recording layers disposed in a thickness direction of the optical recording medium.

18. The optical recording medium as claimed in claim 1, wherein the tapered protruding portions include the optical near field generation film, the protection film, and the recording film that are stacked on the substrate in an order of the optical near field generation film, the protection film, and the recording film.

19. The optical recording medium as claimed in claim 1, wherein the tapered protruding portions include the optical near field generation film, the protection film, and the recording film that are stacked on the substrate in an order of the recording film, the protection film, and the optical near field generation film.

20. An apparatus for recording or reproducing signals, the apparatus comprising:
an optical source for irradiating a light beam;
an optical head for condensing the light beam onto an optical recording medium including a plurality of recording tracks being disposed, along a predetermined direction, on a signal recording surface to which the light beam is incident, the recording tracks having tapered protruding portions; and
a moving part for moving the optical head;
wherein the signals are recorded on the optical recording medium or reproduced from the optical recording medium by an optical near field generated from the light beam condensed to a tip portion of the tapered protruding portions.

21. An apparatus for recording or reproducing signals, the apparatus comprising:
an optical source for irradiating a light beam;
an optical head for condensing the light beam onto an optical recording medium including a plurality of recording tracks being disposed, along a predetermined direction, on a signal recording surface to which the light beam is incident, the recording tracks having tapered protruding portions;
a moving part for moving the optical head; and
a magnetic head for functioning as a magnetic field modulating magnetic recording head and a magnetic reproduction head;
wherein the signals are recorded on the optical recording medium or reproduced from the optical recording medium by an optical near field generated from the light beam condensed to a tip portion of the tapered protruding portions.

22. The apparatus as claimed in claim 21, wherein the magnetic head is a giant magnetic resistance head or a tunnel magnetic resistance head.

23. The apparatus as claimed in claim 21, further comprising an optical super resolution part for reducing the optical strength of a portion of the optical recording medium surrounding a beam spot of the light beam.

24. The apparatus as claimed in claim 21, wherein after the optical recording medium is mounted to the apparatus, the optical recording medium is recorded with address information for indicating locations inside the optical recording medium.

25. The apparatus as claimed in claim 21, wherein a linearly polarized light of the incident light beam irradiated from the optical source is a p-polarized light that perpendicularly intersects a scanning direction of the optical recording medium.

26. A memory apparatus comprising:
an optical source for irradiating a light beam;
an optical head for condensing the light beam onto an optical recording medium including a plurality of recording tracks being disposed, along a predetermined direction, on a signal recording surface to which the light beam is incident, the recording tracks having tapered protruding portions;
a moving part for moving the optical head in a direction along the recording tracks;
a detecting part for detecting reflected light from the optical recording medium; and
a tracking control part for executing tracking control with the moving part according to push-pull signals obtained from the detecting part.

27. An apparatus for recording or reproducing signals, the apparatus comprising:
an optical source for irradiating a light beam;
an optical head for condensing the light beam onto an optical recording medium including a plurality of recording tracks being disposed, along a predetermined direction, on a signal recording surface to which the light beam is incident, the recording tracks having tapered protruding portions; and
a moving part for moving the optical head;
wherein the signals are recorded on the optical recording medium or reproduced from the optical recording medium by an optical near field generated from the light beam condensed to a tip portion of the tapered protruding portions; and
wherein the optical head includes apertures, having no more than half the size of the wavelength $\lambda$ of the light beam, disposed along a predetermined direction.

28. A method of recording or reproducing signals comprising the steps of:
irradiating a light beam from an optical source;
condensing the light beam onto an optical recording medium including a plurality of recording tracks being disposed, along a predetermined direction, on a signal recording surface to which the light beam is incident, the recording tracks having tapered protruding portions; and
recording or reproducing signals with an optical near field generated from the tapered protruding portions of the optical recording medium.

* * * * *